(12) United States Patent
Larrick et al.

(10) Patent No.: US 7,209,523 B1
(45) Date of Patent: *Apr. 24, 2007

(54) ULTRA-WIDEBAND RECEIVER AND TRANSMITTER

(75) Inventors: J. Frederick Larrick, Silver Spring, MD (US); Robert J. Fontana, Potomac, MD (US)

(73) Assignee: Multispectral Solutions, Inc., Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/251,297

(22) Filed: Feb. 17, 1999

Related U.S. Application Data

(63) Continuation-in-part of application No. 08/857,836, filed on May 16, 1997, now Pat. No. 6,026,125, and a continuation-in-part of application No. 08/872,729, filed on Jun. 11, 1997, now Pat. No. 5,901,172.

(51) Int. Cl.
*H04L 27/04* (2006.01)
*H03K 9/00* (2006.01)

(52) U.S. Cl. .................. 375/295; 375/130; 375/316

(58) Field of Classification Search .......... 375/130, 375/219, 295, 316; 342/13, 21, 27, 159, 342/201

See application file for complete search history.

(56) References Cited

U.S. PATENT DOCUMENTS

| | | | | |
|---|---|---|---|---|
| 3,883,871 A | * | 5/1975 | Moore | 342/201 |
| 3,983,422 A | * | 9/1976 | Nicolson et al. | 327/195 |
| 4,688,042 A | * | 8/1987 | Cronson et al. | 342/19 |
| 5,337,054 A | * | 8/1994 | Ross et al. | 342/93 |
| 5,455,593 A | * | 10/1995 | Ross | 342/375 |
| 5,457,394 A | * | 10/1995 | McEwan | 324/642 |
| 5,521,600 A | * | 5/1996 | McEwan | 342/27 |
| 5,523,760 A | * | 6/1996 | McEwan | 342/89 |
| 5,677,927 A | * | 10/1997 | Fullerton et al. | 375/130 |
| 5,901,172 A | * | 5/1999 | Fontnan et al. | 375/130 |
| 5,966,090 A | * | 10/1999 | McEwan | 342/27 |
| 6,026,125 A | * | 2/2000 | Larrick, Jr. et al. | 375/295 |
| 6,191,724 B1 | * | 2/2001 | McEwan | 342/21 |

* cited by examiner

*Primary Examiner*—Chieh M. Fan
(74) *Attorney, Agent, or Firm*—McIntyre Harbin & King

(57) ABSTRACT

A waveform-adaptive ultra-wideband (UWB) transmitter and noise-tracking UWB receiver for use in communications, object detection and radar applications. In one embodiment, the output of an oscillator is gated by a low-level impulse generator either directly or through an optional filter. In a special case of that embodiment wherein the oscillator is zero frequency and outputs a DC bias, a low-level impulse generator impulse-excites a bandpass filter to produce an UWB signal having an adjustable center frequency and desired bandwidth based on a characteristic of the filter. In another embodiment, the low-level impulse signal is approximated by a time-gated continuous-wave oscillator to produce an extremely wide bandwidth pulse with deterministic center frequency and bandwidth characteristics. The low-level impulse signal can be generated digitally. The UWB signal may be modulated to carry data, or may be used in object detection or ranging applications. The power amplifier may be gated to provide a power-efficient UWB transmitter. The UWB transmitter exhibits well defined and controllable spectral characteristics. The UWB transmitter is capable of extremely high pulse repetition frequencies (PRFs) and data rates in the hundreds of megabits per second or more, frequency agility on a pulse-to-pulse basis allowing frequency hopping if desired, and extensibility from below HF to millimeter wave frequencies.

50 Claims, 17 Drawing Sheets

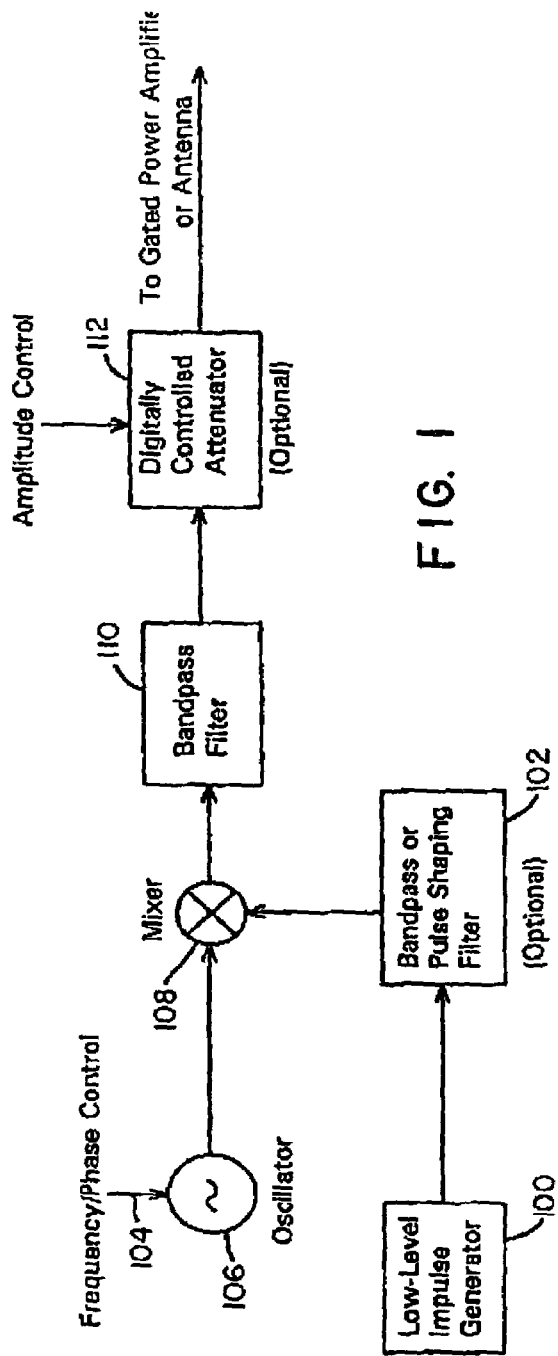
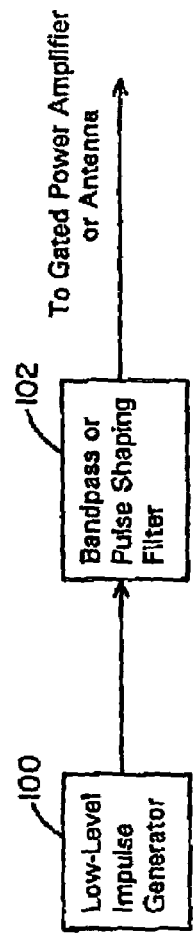
FIG. 1
FIG. 2

ULTRA-WIDEBAND RECEIVER AND TRANSMITTER

CROSS-REFERENCE TO RELATED APPLICATIONS

This application combines the transmitter-receiver disclosures and is a continuation-in-part of commonly-owned U.S. patent application Ser. Nos. 08/857,836 and 08/872,729 filed May 16, 1997 and Jun. 11, 1997, respectively, by the same inventors hereof (now U.S. Pat. Nos. 6,026,125 and 5,901,172, respectively). The subject matter of each of said applications is incorporated herein.

This application is also related to commonly-owned U.S. application Ser. No. 09/118,919 filed Jul. 20, 1998 (now U.S. Pat. No. 6,239,741), also incorporated herein.

BACKGROUND OF THE INVENTION

1. Field of the Invention

This invention relates to the field of ultra-wideband communication systems. More particularly, it relates to the controlled transmission and reception of ultra-wideband electromagnetic pulses.

2. Background of Related Art

Ultra-wideband (UWB) systems, both for radar and communications applications, have historically utilized impulse, or shock-excited, transmitter techniques in which an ultra-short duration pulse (typically tens of picoseconds to a few nanoseconds in duration) is directly applied to an antenna which then radiates its characteristic impulse response. For this reason, UWB systems have often been referred to as "impulse" radar or communications. In addition, since the excitation pulse is not a modulated or filtered waveform, such systems have also been termed "carrier-free" in that no apparent carrier frequency is evident from the resulting RF spectrum.

To be useful for data communications, previous UWB impulse or carrier-free transmission systems have been limited to ON-OFF keying (binary amplitude shift keying ASK) or pulse position modulation (PPM) since amplitude and/or phase control of the waveform was extremely difficult or impossible to implement. In addition, these previous systems have been fixed bandwidth and fixed frequency with no capability for frequency hopping or dynamic bandwidth control.

Output power and pulse repetition frequency (PRF) of UWB impulse transmitters have also been limited due to fundamental physical limitations of the devices used to generate the ultra-short duration pulses. In particular, high output power and high PRF were mutually exclusive properties of such systems. High output power impulse excitation sources such as bulk avalanche semiconductors, high voltage breakover devices, high voltage Gallium Arsenide (GaAs) thyristors, plasma diodes, stacked arrays of step recovery diodes (SRDs), etc. required hundreds to many thousands of volts for proper operation and, consequently, were limited to PRFs below a few tens of kilohertz due to increased device heating and thermal breakdown at higher PRFs. Lower power devices, such as avalanche transistors, low voltage SRDs, Zener diodes, etc., can operate at PRFs of several megahertz, but produced output powers many orders of magnitude lower. In addition, while the individual devices were typically low cost, they often needed to be hand-selected in order to guarantee avalanche or breakdown characteristics at a particular operating voltage level.

As an example, early versions of UWB impulse transmitters typically generated less than one watt peak microwave output power at a maximum PRF of approximately 10 kHz using baseband impulse excitation powers of tens to several thousand watts. Several laboratory models using these high voltage sources were constructed for radar applications which included ship docking, pre-collision sensing for automobiles, liquid level sensing, and intrusion detection. Although these techniques proved to be reliable, the power efficiency, PRF limitations, size and complicated antenna assemblies limited performance and reproducibility.

Another significant limitation of such impulse-based UWB sources is the fact that the power level decreases with increasing frequency at a rate of approximately 12 dB per octave. This is due to the double exponential nature of the impulse excitation. The output response from a typical impulse source has the form:

$$p(t) = \frac{t}{\alpha} e^{(1-\frac{t}{\alpha})} u_{-1}(t)$$

where $\alpha$ is the pulse rise time and $u_{-1}(t)$ is the unit step function. FIG. 10 shows the output response $p(t)$ versus time. This waveform closely approximates the output seen from the vast majority of impulse sources.

One can now compute the instantaneous pulse power versus frequency (magnitude-squared Fourier transform) as:

$$P(f) = \frac{e^2}{16\pi^4} \frac{1}{\alpha^2 f^4}$$

Note that if the rise time is doubled, the power at any given frequency decreases by 6 dB. Similarly, for a constant peak voltage source, doubling the frequency of operation decreases the output power by 12 dB.

As an example, a 2.5 kW peak power output thyristor-based impulse generator develops only about 1 watt peak power at L-Band (1.5 GHz range) since the vast majority of the impulse energy is produced at significantly lower frequencies. This unused energy is dissipated as heat, subjecting operating circuits to overheating and damage, and limiting the PRF or data rate at which the source can operate reliably. The upper trace in FIG. 11 shows the rapid drop in available power versus frequency from a conventional thyristor-based impulse source.

Another limitation in the use of such techniques is the lack of accurate control of radiated emissions to meet regulatory requirements. Since a short pulse excitation will stimulate the impulse response of an antenna, and a typical wideband antenna has a frequency response extending over many octaves in frequency (an octave of frequency being a doubling of frequency), the radiated spectrum will be extremely broadband, covering hundreds of megahertz (MHz) to several gigahertz (GHz) or more of instantaneous bandwidth. This broad spectrum may overlap many frequencies of operation licensed otherwise by the U.S. Federal Communications Commission (FCC) in the U.S. or by other means in foreign countries, thus presenting a concern to operators or users of allocated frequencies, albeit at very low average power levels.

Thus, conventional UWB signal generation techniques suffer from several shortcomings:
  (i) high power operation can only be achieved at reduced PRFs because of device heating;
  (ii) practical operational frequencies are limited to well below 5 GHz due to the 12 dB per octave falloff of output impulse energy with increased frequency;
  (iii) impulse excitation of an antenna results in a "carrier-free" signal which would uncontrollably overlap frequencies restricted from such use, albeit with low energy densities; and
  (iv) modulation techniques are limited to on-off keying and pulse position modulation, with no capability for frequency hopping or for dynamic bandwidth control.

There is a need to achieve a higher output power for long distance communications and for small target detection in the case of a radar system, to develop high PRFs for the transmission of wideband video and data, to produce UWB transmissions at well-controlled center frequencies and bandwidths extending to higher operating frequencies (e.g., millimeter wave), and to allow for newer and more efficient modulation techniques.

One of the first ultra wideband (previously referred to as baseband, carrier-free or short pulse) receivers was patented in 1972 by Ken Robbins while at the Sperry Research Center, U.S. Pat. No. 3,662,316. This receiver utilized a "dispersionless" broadband transmission line antenna together with a biased tunnel diode located in the transmission line for detecting the total energy in a pulse and expanding the resultant output in the time domain so that conventional, lower speed circuitry may be used for processing. The tunnel diode was biased to operate as a monostable multivibrator as disclosed in 1962 in Gentile, S. P., *Basic Theory and Application of Tunnel Diodes*, Van Nostrand, NJ, ch. 8 "Pulse and Switching Circuits" (1962). The receiver took advantage of the tunnel diode's unique characteristic of changing state when the area under the current vs. time envelope, i.e., the charge carriers passing through the device, exceeded a prescribed number of picocoulombs. This change in state yielded a recognizable, detectable event or output voltage. Sperry's tunnel diode detector (TDD) receiver was used in a number of applications including baseband communications, liquid level sensing, object detection and radar. It was soon observed, however, that the Robbins TDD was subject to operating point bias drift due to temperature and power supply fluctuations. This bias drift impacted negatively the system's overall sensitivity and increased the false alarm rate.

In 1976, Nicolson and Mara introduced a constant false alarm rate (CFAR) circuit to the tunnel diode detector receiver that is described in U.S. Pat. No. 3,983,422. The CFAR circuit employed a logic circuit that sampled noise dwells and data dwells to dynamically adjust a variable avalanche threshold of the tunnel diode. This feedback circuit operated in such a manner that the false alarm rate, as measured by the number of hits received due solely to noise during a fixed time interval, was held constant regardless of temperature fluctuations, power supply voltage changes, device aging, etc. The CFAR receiver was utilized in the development of baseband speed sensing, collision avoidance, and radar docking prototypes.

In 1987, an anti-jam circuit was introduced into the CFAR receiver. This is described in U.S. Pat. No. 4,688,041. Since the baseband receiver was extremely broadband, with typical bandwidths of hundreds of MHz to GHz, it was found to be extremely susceptible to in-band interference and jamming since the tunnel diode circuit could not distinguish between valid and unwanted signals. Such in-band signals caused a significant reduction in receiver sensitivity by causing the CFAR loop to back-off the sensitivity of the tunnel diode detector. The anti-jam circuit disclosed in U.S. Pat. No. 4,688,041 used the jamming signal itself (if sufficiently strong), or else an internally switched continuous wave (CW) signal, as a local oscillator signal to heterodyne the incoming signal prior to detection. However, this anti-jam circuit proved to be ineffective in the presence of barrage (broadband) noise, jamming or interference, and/or multiple in-band CW interfences. In the case of barrage noise, no reference frequency is provided by the interference with which to down convert the incoming signal, and the system reverts to single-conversion super heterodyne operation with an internal first local oscillator. The broadband noise is also down converted with the signal, and no anti-jam improvement is obtained. In the latter case of multiple in-band CW interferers, the circuitry will use one of these tones, or a linear combination depending upon the third order intercept properties of the design. In this case, the remaining tones are also heterodyned to near baseband and act once again as strong in-band jamming signals.

Also in 1987, U.S. Pat. No. 4,695,752 disclosed a narrow range gate added to the existing baseband CFAR receiver. The reduction in range gate size had the effect of reducing unwanted noise and interference by more closely matching the detector with the received pulse duration. The inventor of this patent purports to achieve nanosecond range gate intervals through the use of two Germanium (Ge) and a single Gallium Arsenide (GaAs) tunnel diode.

In 1994, U.S. Pat. No. 5,337,054 to Ross and Mara disclosed a coherent processing tunnel diode UWB receiver. These inventors claim to have improved tunnel diode detector receiver sensitivity by using a tunnel diode envelope generator to perform a super heterodyne conversion whereby the available charge for triggering the tunnel diode is maximized. Ross and Mara considered only single pulse ultra wideband detectors; i.e., detectors which make a binary, or hard, decision (Logic 1 or Logic 0) at every sampling instant. However, their patent discloses a sliding average of detector hits, noise dwell or data dwell, in any group of thirty-two consecutive periods (col. 4, lines 35–39). Averaging of all hits, including data dwells, provides an average of the noise dwells which is skewed because of the inclusion of the data swells. Moreover, to reduce the effects of the skewing, a large number of noise dwells must be detected for each data dwell detected, ultimately reducing data rates.

There have been other patented UWB receiver designs in which a multiplicity of pulses (typically several thousand) are first coherently added, or integrated, before a binary (bit) decision is made (e.g., U.S. Pat. Nos. 5,523,760; 4,979,186; and 5,363,108). The UWB detectors of the present invention do not require coherent addition of a multiplicity of pulses, but rather have sufficient sensitivity to operate on a single pulse basis.

Only false alarm rate is typically computed by the processor of an UWB receiver, and thus the system bit error rate (BER), and accordingly the receiver operating characteristic (ROC) are unknown. In practice, the tunnel diode bias is "backed off" from the CFAR level to reduce the BER to an acceptable level. Unfortunately, since the BER is a very sensitive function of the tunnel diode bias level, this can result in a significant reduction in receiver sensitivity to achieve a desired BER.

As disclosed in U.S. Pat. No. 3,662,316, in a tunnel diode UWB receiver, the tunnel diode changes state whenever the accumulated charge on the device exceeds a given threshold. Mathematically, the performance of the tunnel diode detector in additive white Gaussian noise (AWGN) can be described by the following set of equations:

$$P_d = \text{Probability}\left(\max_{0 \leq t \leq T} \int_0^t (s(u) + n_w(u)) du \geq T_h\right) \text{ and}$$

$$P_{fa} = \text{Probability}\left(\max_{0 \leq t \leq T} \int_0^t n_w(u) du \geq T_h\right)$$

where $P_d$ is the probability of detection, $P_{fa}$ is the probability of false alarm, s(u) is the received UWB waveform, $n_w(u)$ is additive white Gaussian noise with double-sided power spectral density $N_0B$, B is the detection signal bandwidth, T is the diode dwell sensitivity interval, and $T_h$ is a threshold value.

While previous designs of the CFAR tunnel diode receiver have functioned reliably as an ultra wideband single pulse detector, their use in modern communication and radar applications have presented numerous drawbacks:

1. The prior art designs remain susceptible to in-band interference and jamming, particularly broadband or barrage noise jamming and multiple CW interferers.
2. The requirement to continuously adjust bias to the tunnel detector to maintain a given constant false alarm rate (CFAR) conventionally requires a minimum number of noise dwells to take place for each data dwell—typically thirty-two or more noise dwells for each data dwell—to achieve false alarm rates less than a few percent. This severely restricts the maximum data rate at which a single detector can operate since data and noise dwells must operate at different time intervals. In addition, the speed at which the tunnel diode detector can respond to sudden changes in the electromagnetic environment is limited. Hence, impulsive noise (which is nearly always present) can create burst errors in the data stream, corrupting data integrity.
3. Receiver sensitivity is conventionally backed-off to achieve a desired BER, providing an UWB receiver which has reduced distance capability and slower data rates.

SUMMARY OF THE INVENTION

The present invention provides a breakthrough in UWB communications in that it generates a waveform adaptive or carrier controlled UWB signal having an adjustable center frequency and an adjustable bandwidth. These adjustments can be performed on a pulse-by-pulse basis, allowing for UWB frequency hopping and adaptive bandwidth control.

One preferred embodiment distinctively utilizes a low-level impulse-gated oscillator to produce an extremely wide bandwidth pulse which can operate at extremely high pulse repetition frequencies (FIG. 1). Precise control of radiated frequency is governed by the choice of oscillator which has a known stable frequency. The oscillator can be fixed frequency or a voltage controlled oscillator (VCO), the latter in particular for UWB frequency hopping applications. Oscillator phase may also be controlled to generate an additional phase modulation. With suitable choice of oscillator and mixer, UWB signals can be generated with center frequencies from near DC to millimeter wave frequencies. Signal bandwidth is governed by a bandpass or pulse shaping filter which, when used to drive a wideband mixer, controls the spectral characteristics of the output waveform. An output bandpass filter further limits out of band energy; and a gated power amplifier is used to amplify the UWB signal to the desired peak power output level.

Another embodiment distinctively utilizes a low-level impulse generator and bandpass or pulse shaping filter without need for a separate oscillator and mixer (FIG. 2). This embodiment is particularly useful for non-agile operation at frequencies below 5 GHz for which sufficient impulse energy can be generated to drive an additional gated power amplifier. This approach is mathematically equivalent to that of FIG. 1 when the oscillator frequency is chosen to be precisely zero. In this case, UWB signal center frequency and bandwidth are directly determined by the characteristics of the bandpass or pulse shaping filter.

Another variant of the impulse-gated oscillator is derived through the use of analog or digital time-gating (FIG. 3). In this embodiment, the low-level impulse excitation is approximated by the response of a set of high-speed switches (FIG. 4). These switches gate the oscillator output ON for a very short time period (FIG. 5). Such time-gating may also be achieved through the use of analog or digital pulse shaping circuitry (FIG. 6).

VCOs in the L-band (1.5 GHz) and in the X-band (10 GHz) region were implemented in exemplary embodiments of the present invention, although it is equally possible that oscillators of other types and of other frequencies can be used. Unlike conventional impulse or "carrier-free" techniques, one aspect of the present invention provides an UWB signal having a well-defined, controllable carrier frequency and bandwidth with the additional capability for independent phase and amplitude modulation.

Each of these UWB transmitters can operate at extremely high data rates, enabling the transmission of high speed data such as real-time digitized video, multiple simultaneous digital voice channels, or other information, as well as enabling a range measuring device to transmit high PRF pulse trains for radar or ranging applications.

To achieve high power output from any of these UWB sources, a gated power amplifier is used (FIG. 8). The gated power amplifier has the unique feature of high power efficiency as the power amplifier is only turned on for approximately the duration of the UWB pulse.

As a receiver, a microwave tunnel diode is utilized as a single pulse detector for short pulse, impulse, baseband or ultra wideband signals. The UWB receiver has a number of unique features which permit highly sensitive operation at extremely high speeds (multiple Mb/s) with high immunity to in-band jamming.

For instance, the tunnel diode detector bias point is preferably determined only once, and preferably at system start-up, through an automatic calibration procedure. In this fashion, the tunnel diode detector is set to its highest sensitivity point relative to the desired bit error rate performance based upon internal noise only, and remains at that point during the entire reception process. Conventional CFAR-based UWB receivers continually update the detector bias point, resulting in reduced detector sensitivity in the presence of in-band jamming (i.e., receiver back-off), and extremely slow response times because of the need to constantly recalculate the false alarm rate. Rather than adjust the bias to the tunnel diode detector, the present invention adjusts the attenuation of the incoming UWB signal. An adaptive dynamic range extension process using a high speed, Gallium Arsenide (GaAs) voltage variable attenuator (VVA) provides high noise immunity. The instantaneous attenuation level is determined by periodically sampling the ambient noise.

A high speed switch time-gates the tunnel diode detector by switching between a gate active mode in which the tunnel diode detector is connected to the receiver front end circuitry for reception of an UWB pulse; and a gate inactive mode in which the signal input is removed from the detector and charge stored in the tunnel diode detector is discharged. Conventional designs have previously used the tunnel diode bias voltage itself to gate the tunnel diode detector, resulting in reduced RF sensitivity due to transients induced by the bias switching circuitry.

Accordingly, it is an object of the present invention to provide a frequency and bandwidth adaptive UWB transmitter.

It is a further object to provide an UWB transmitter having controllable spectral features superior to those provided by conventional impulse and "shock-excited" UWB signal generating transmitters.

It is a further object to provide an UWB transmitter system that obviates pulse repetition frequency (PRF) limitations of conventional systems, thus allowing extremely high data rates on the order of hundreds of megabits per second.

It is yet another object of the present invention to provide an UWB transmitter having frequency extensibility to millimeter wave frequencies by suitable selection of an RF carrier and impulse- or time-gating characteristics.

It is an additional object to provide an UWB transmitter having digital amplitude and/or phase control to permit the generation of M-ary communications waveforms such as ultra-wideband quadrature amplitude modulation (QAM), quadrature phase shift keying (QPSK), etc.

It is a further object to provide an UWB transmitter having frequency agility (e.g., frequency hopping) through direct digital control (DDC) of the RF oscillator center frequency.

It is another object to provide an UWB transmitter having pulse width agility, and thus bandwidth agility, through the use of direct digital control of the time-gating circuitry parameters.

It is also an object to provide an UWB transmitter having 50 Ω impedance matching for ease of fabrication into stripline or microstrip hybrid or multi-chip module (MCM) circuits.

It is another object to provide an UWB transmitter permitting the use of wideband Monolithic Microwave Integrated Circuit (MMIC) power amplifiers to deliver an efficient, significant and accurately controllable amount of transmitter power to an antenna.

It is yet another object to provide an UWB transmitter with a gated power amplifier that achieves high power efficiency because it draws minimal current except during the brief period of time in which the UWB pulse is being generated. Because of the extremely low duty cycle of an UWB waveform, even at high PRFs, the gated power amplifier is important to the UWB transmitter in designs requiring low power consumption such as battery-operated handheld radios, unattended sensors, etc.

It is also an object of the present invention to provide an UWB receiver which operates with extremely high sensitivity at extremely high speeds with high immunity to in-band jamming.

It is a further object to provide a method of calibrating the bias threshold of an UWB receiver.

It is another object to provide an UWB receiver which biases a tunnel diode detector at its highest sensitivity point based on internal noise only.

It is a further object to provide an UWB receiver which uses a high speed, adaptive dynamic range extension process.

It is also an object of the present invention provide an UWB receiver which switchably discharges the tunnel diode detector between data dwells.

An additional object is to provide an UWB receiver having separate data and noise dwell measurement circuitry.

These and other objects of the invention will become more readily apparent upon review of the following description. The invention, though, is pointed out with particularity by the appended claims.

BRIEF DESCRIPTION OF THE DRAWINGS

The invention will be described with reference to the drawings, in which:

FIG. 1 shows a first embodiment of the present invention in which an UWB transmitter utilizes an impulse-gated oscillator.

FIG. 2 shows a second embodiment of an UWB transmitter of the present invention in which a low-level impulse generator directly excites a bandpass or pulse shaping filter, without the use of an oscillator or mixer, prior to gated power amplification. This circuit is equivalent to that of FIG. 1 with a zero frequency oscillator (i.e., DC bias on the mixer).

DESCRIPTION OF ILLUSTRATIVE TRANSMITTER EMBODIMENTS

Figure 3:
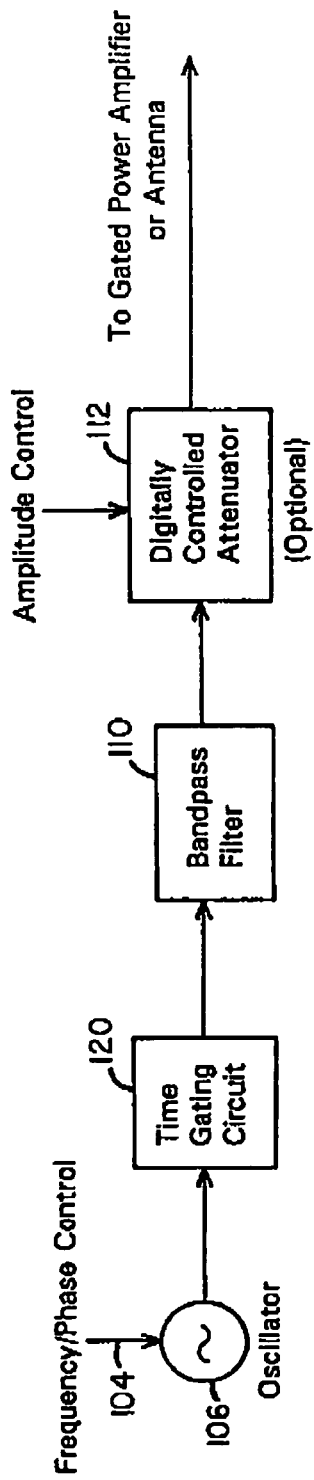
FIG. 3 is a block diagram of another embodiment of the present invention showing an UWB transmitter utilizing time gating circuitry which approximates the response of a low-level impulse.

Without limitation of the invention, two classes of UWB transmitters which generate UWB signals having controllable spectral characteristics according to the present invention will be described. The first class of UWB transmitters include an impulse-gated oscillator (and the special case in which the oscillator frequency is precisely zero), and the second class includes a time-gated oscillator in which time-gating circuitry approximates the response of a low-level impulse.

Microwave components of the present invention may be built to operate into 50 ohms to obtain maximum power transfer, to make use of readily available radio frequency (RF) components, and to provide a readily manufacturable design using conventional microstrip or stripline circuitry.

Class I: Impulse-Gated Oscillator (IGO) UWB Transmitters

FIG. 1 shows an UWB transmitter in which a low-level impulse is used to gate an oscillator to produce an UWB output.

Low-level impulse generator 100 excites an optional bandpass or pulse shaping filter 102 with a low-level impulse. Low-level impulse generator 100 can comprise any number of possible devices, including low voltage SRDs, Zener diodes, avalanche transistors, break over devices (BODs), thyristors, etc. One particular embodiment utilized an SRD, part no. MA44768-287 commercially available from M/A-COM, together with driving electronics.

If filter 102 is not utilized, the low-level impulse is used to directly gate oscillator 106 by switching mixer 108 to alternately pass or not pass the oscillator output to the input of bandpass filter 110. The particular microwave mixer 108 used for the L-band, 1.5 GHz implementation is commercially available from Mini-Circuits Lab, part no. RMS-25MH. For proper operation, adequate ON/OFF isolation between output UWB signal pulse and gating signal can be achieved through the use of multiple mixers. Approximately 40 to 60 dB isolation is believed to provide adequate security.

The amplitude of the low-level impulse generator 100 can be adjusted to change the pulse width, and hence the instantaneous bandwidth, of the UWB signal at the output of mixer 108. By increasing the amplitude, a larger time exists in which the oscillator signal appears at the output of mixer 108 (wider pulse width) because of the increased time during which the mixer diodes are forward biased. Conversely, the lower the amplitude of the low-level impulse generator output, the shorter the time in which the oscillator signal appears at the output of mixer 108 (shorter pulse width). The bandwidth of the resultant UWB signal can be varied on a pulse-by-pulse basis by digitally controlling the amplitude of the low-level impulse generator output into the mixer.

Thus, mixer 108, in effect, acts as a high speed switch which amplitude modulates the signal output from oscillator 106 with impulse excitation from low-level impulse generator 100. The resultant pulse envelope preserves the original time domain shape of the impulse excitation. Only a few milliwatts of peak power are needed to drive the mixer diodes of the mixer 108 into saturation, and thus low voltage impulse sources can be utilized with the advantage that extremely high speed (hundreds of megabits per second) UWB signaling can be achieved.

If filter 102 is utilized, the mixer acts to heterodyne the bandpass-filtered or pulse shaped low-level impulse signal to the desired operating center frequency. The bandwidth of the UWB signal at the output of mixer 108 is then determined by the bandwidth of the bandpass or pulse shaping filter 102. Using this approach, low-level impulse generator 100 can be operated at a lower frequency, with the broadband energy shifted in frequency to the desired range.

The center frequency, as well as the instantaneous phase, of the UWB signal can be controlled via oscillator control 104. This allows for frequency agile UWB emissions by simply changing the frequency of the oscillator 106 according to a desired hopping pattern. In addition, the instantaneous phase of the UWB pulse can be changed on a pulse-by-pulse basis to allow for various forms of phase modulation.

A pulse-to-pulse coherent waveform can be generated by phase-locking the low-level impulse generator 100 to the oscillator 106. A digitally controlled RF attenuator 112 can be used to allow for additional amplitude modulation. The combination of phase, frequency and amplitude modulations enable the generation of a wide class of UWB waveforms including UWB quadrature amplitude modulation (UWB-QAM), UWB M-ary phase modulation (UWB-PSK), etc. Bandpass filter 110 is used to reject undesirable, or out-of-band, frequencies and/or mixer products prior to gated power amplification and eventual transmission.

The transmitted UWB waveform is not "carrier free" as in conventional UWB systems but instead includes a well-defined and controllable center or carrier frequency established by the frequency of the oscillator 106.

FIG. 2 shows an UWB transmitter in which a low-level impulse generator 100 is used to impulse-excite a bandpass or pulse shaping filter 102. FIG. 2 is a special case of FIG. 1 in which the frequency of oscillator 106 is set to precisely zero. That is, the oscillator of FIG. 1 is replaced by a DC source which serves to always turn ON mixer 108 regardless of the amplitude of the low-level impulse generator. Unlike FIG. 1, the circuitry of FIG. 2 does not easily permit frequency hopping or phase modulation. However, its advantages are that, for center frequencies up to about 5 GHz, the circuit is simple and inexpensive to implement; and, like FIG. 1, allows for high speed operation (because of the use of a high speed low-level impulse source) with controllable spectral filtering and shaping.

Figure 12A:
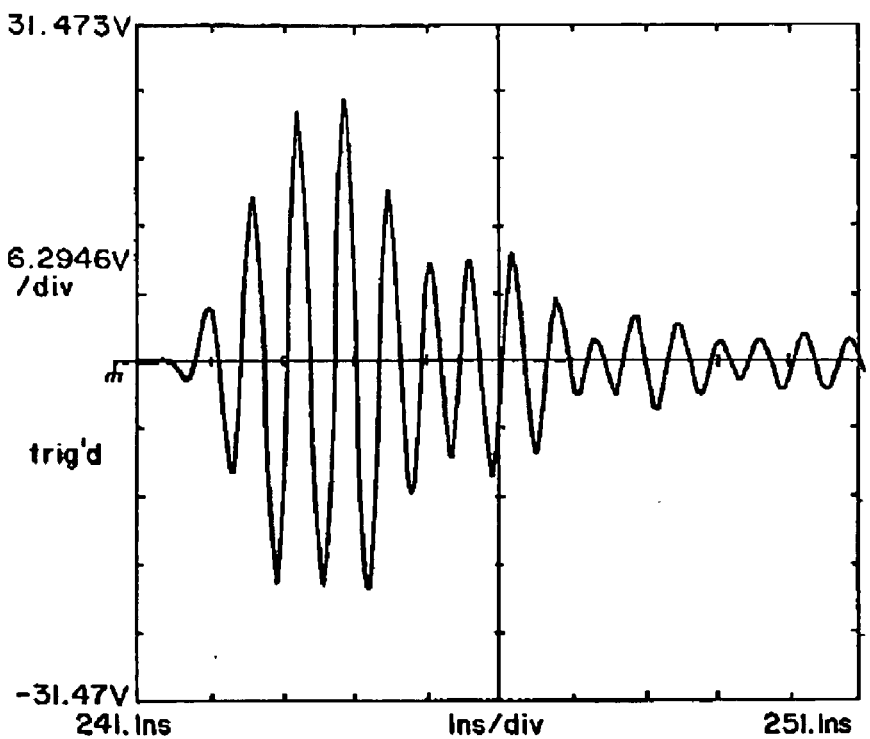
FIG. 12A shows an actual transmitted UWB signal generated by an UWB transmitter using a low-level impulse generator and a microwave bandpass filter, generating an L-band UWB signal at a center frequency of 1.5 GHz with a 3 dB down bandwidth of 400 MHz.
Figure 12B:
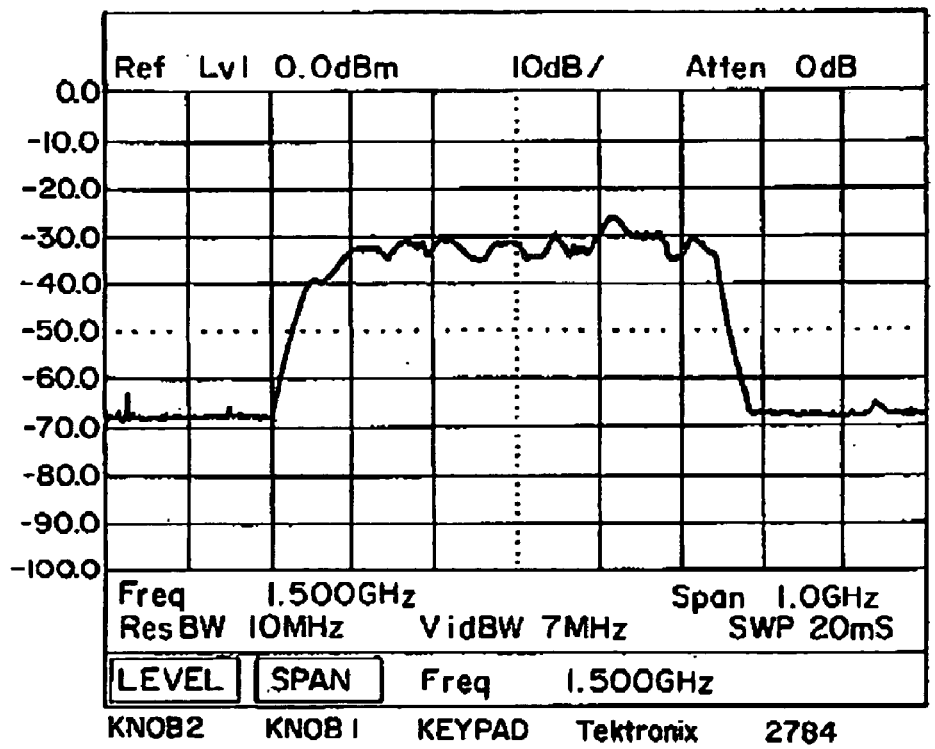
FIG. 12B shows the frequency spectrum of the UWB signal shown in FIG. 12A.

An UWB transmitter using a low-level impulse generator and microwave bandpass filter was constructed which generated an L-band UWB signal at a center frequency of 1.5 GHz, with a 3 dB down bandwidth of 400 MHz. FIG. 12A shows the actual transmitted UWB signal generated by this method. FIG. 12B shows the frequency spectrum of the UWB signal shown in FIG. 12A. The particular filters used were L-band bandpass filters, with a center frequency of 1.5 GHz, a 1 dB bandwidth of 400 MHz, a 3 dB bandwidth of 500 MHz, rejection at 1 GHz of greater than 30 dB down, and rejection at 1.9 GHz of greater than 30 dB down.

Theoretically, to understand how the circuit shown in FIG. 2 provides an UWB signal which includes an apparent carrier, we refer to Carlson, A. Bruce "Communication Systems, An Introduction to Signals and Noise in Electrical Communication", McGraw-Hill, New York, chap. 5.1 (1975), the contents of which are explicitly incorporated herein by reference. According to Carlson, the impulse response $h_{BP}(t)$ of a bandpass filter can be written in quadrature carrier form as follows:

$$h_{BP}(t)=2Re[h_{LP}(t)e^{j\omega_c t}]$$

where Re denotes the real part, $h_{LP}(t)$ is the impulse response of the low pass equivalent of $h_{BP}(t)$, and $\omega_c$ is the center frequency of the bandpass filter. Thus, impulse excitation of bandpass filter 102 is equivalent to heterodyning a low pass spectrum of shape $H_{LP}(f)$ to a center frequency of $\omega_c$. The resultant signal can be extremely broadband, depending only upon the selected characteristic shape and bandwidth of bandpass filter 102. Moreover, the signal is not carrier-free in the conventional sense as the apparent carrier frequency is determined by bandpass filter 102. Also, unlike direct high-power impulse excitation of an antenna as in conventional UWB transmitters, low-level impulse excitation of bandpass filter 102 provides complete control over all aspects of the spectral emissions of the UWB transmitter. This is because the spectral emissions are determined exactly by the characteristics of bandpass filter 102, for instance by the center frequency, bandwidth, out of band rejection and skirt responses.

Figure 8:
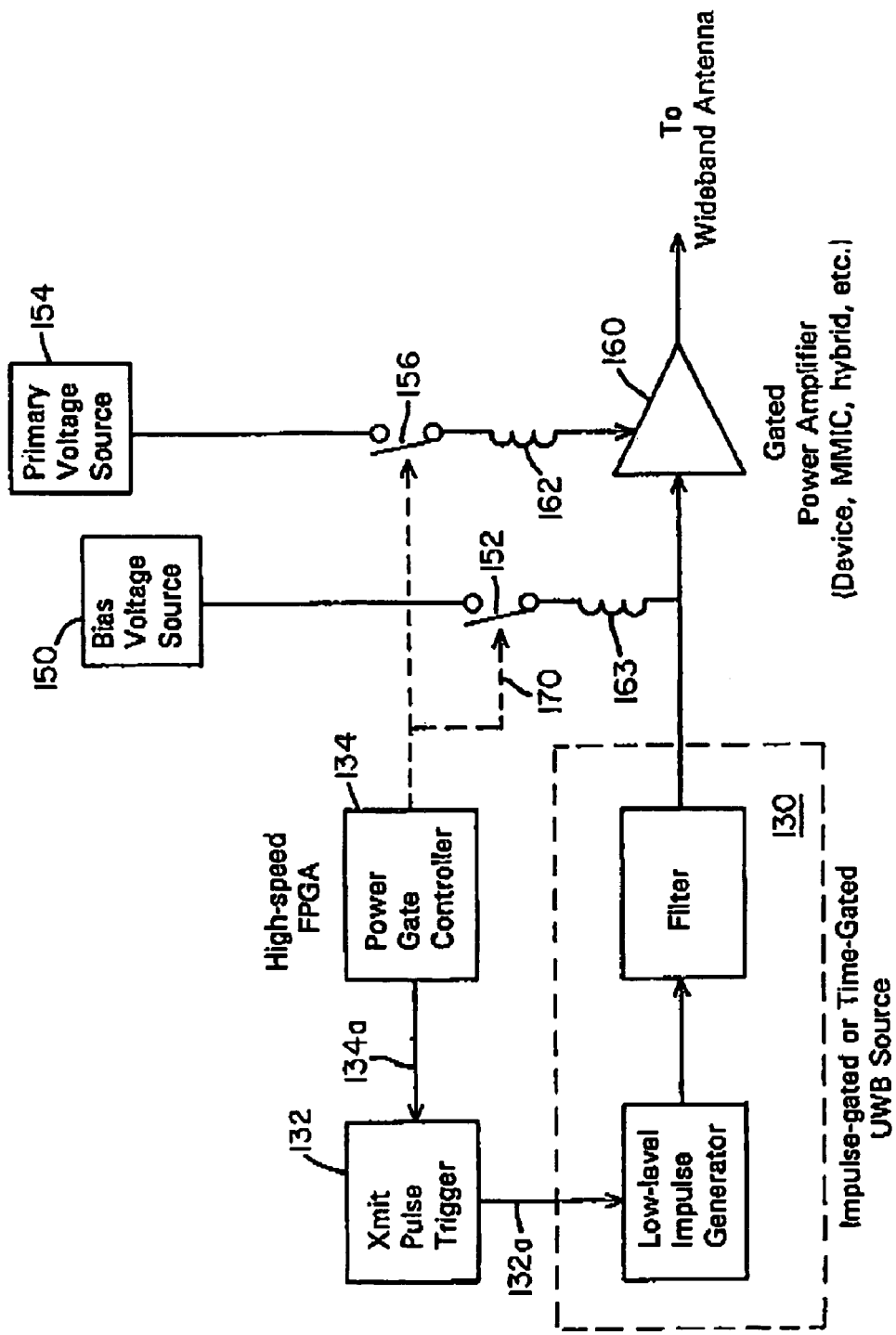
FIG. 8 shows an embodiment of an impulse-gated UWB transmitter utilizing both a microwave oscillator and a low-level impulse generator.

To achieve the desired output power level, a gated power amplifier circuit (FIG. 8) is used. The gating of gated power amplifier 160 is equally applicable to all embodiments of the present invention. In FIG. 8, the output of an impulse-gated or time-gated UWB source 130 is fed to a MMIC amplifier chain of amplifier 160. Any suitable RF amplifiers may be implemented instead of the MMIC amplifiers. The particular MMIC amplifiers used are commercially available from STANFORD MICRODEVICES, part no. SNA-586, operable from DC to 8 GHz. Other amplifiers may be selected for frequencies ranging from HF to millimeter wave.

A power gate controller 134 with transmit pulse logic is formed by a suitably programmed high-speed field programmable gate array (FPGA) or programmable logic device (PLD). The power gate controller 134 generates appropriate timing signals for triggering the low level impulse generator through transmit pulse trigger 132, and for applying voltages as necessary (either bias, primary or both) to the gated power amplifier 160. The impulse-gated or time-gated UWB generator 130 provides a low-level UWB signal to gated power amplifier 160 via an MMIC amplifier chain.

Switches 152, 156, e.g. high speed power bipolar or FET switches, control the application of the bias voltage from the bias voltage source 150 and the primary voltage from the primary voltage source 154, respectively, to gated power amplifier 160. The particular gating switches 152, 156 used were power FETs, part no. IRF7304, commercially available from TEXAS INSTRUMENTS. RF chokes 162, 163 may need to be inserted between gating switches 152, 156 and gated power amplifier 160, depending upon the particular RF power devices used, to prevent RF feedback to the DC supplies.

In the gated power amplifier 160, the total capacitance in the DC power bypassing circuitry was minimized, as the RC time constant of the primary voltage source 154, determined by the source impedance and coupling capacitance, dictates the rate at which the UWB transmitter can reach its full operating power output. Only extremely fast turn-on, low impedance switches (e.g., GaAs MMIC switches) were used, and timing accuracies as shown in FIG. 9 were maintained to nanosecond resolution for optimal efficiency.

Figure 9:
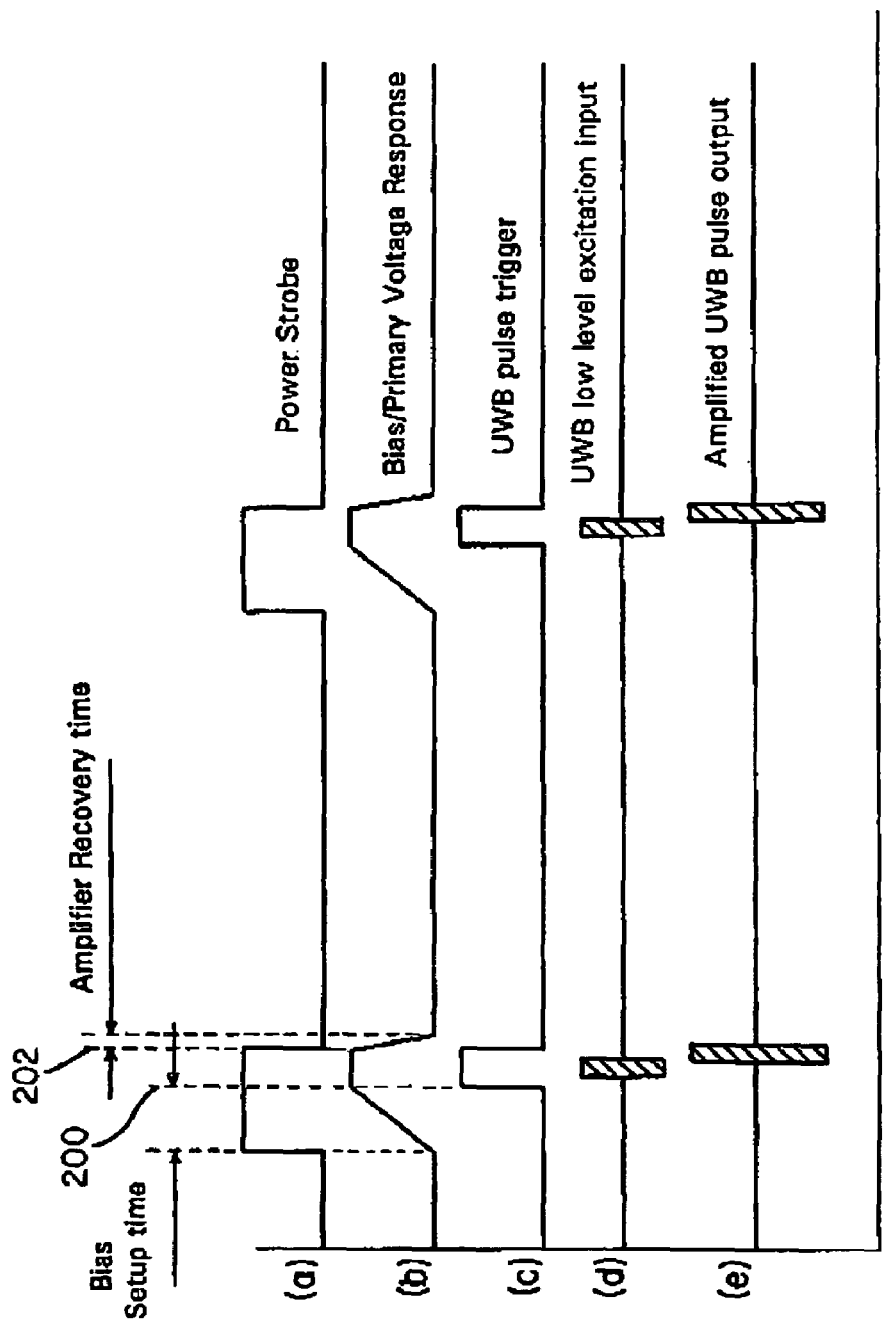
FIG. 9 shows a timing diagram for the circuit shown in FIG. 8.
Figure 10:
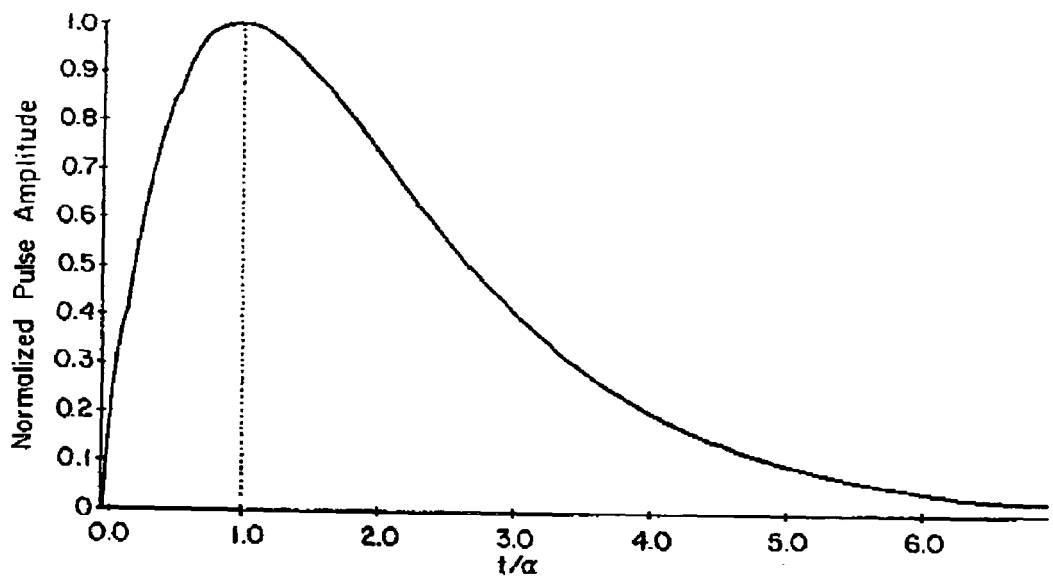
FIG. 10 shows a normalized plot of UWB signal pulse amplitude of a conventional impulse source versus time.
Figure 11:
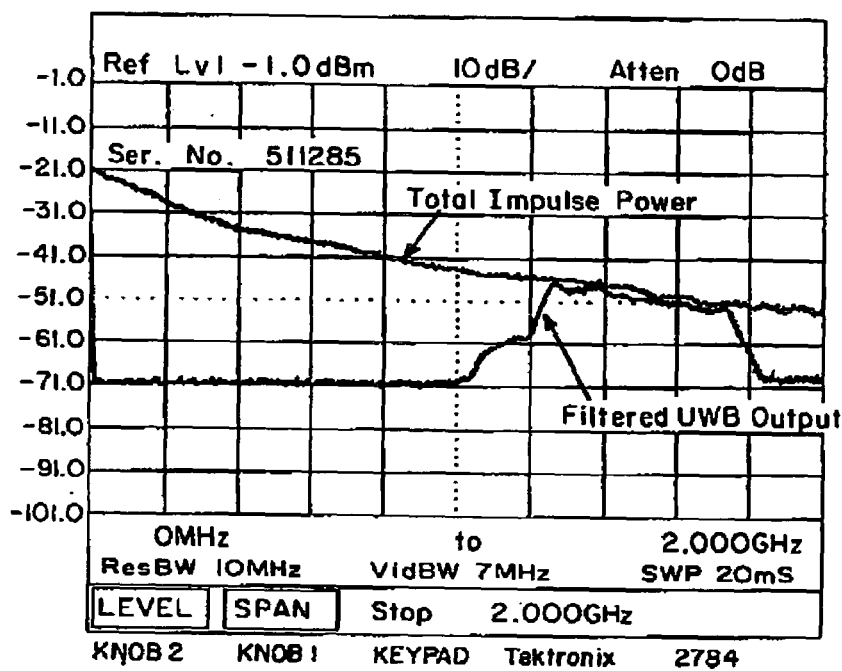
FIG. 11 shows the power spectrum of an impulse UWB signal, superimposed with a filter signal in the L-band, for explaining the small amount of power of an impulse signal in the L-band.

FIG. 9 shows the timing diagram for gated power amplifier 160. In waveform (a), a power strobe signal 134a (FIG. 8) is output from power gate controller 134 in advance of the transmit pulse trigger so that the DC operating parameters of the gated power amplifier 160 stabilize prior to application of the UWB pulse. Since the UWB signal pulse is of extremely short duration (i.e., of only a few nanoseconds or sub-nanoseconds), it is only necessary to bias gated power amplifier 160 ON during the time that the UWB signal pulse presents itself to the input terminals of gated power amplifier 160, plus the additional time necessary for the UWB signal pulse to propagate through gated power amplifier 160. Additionally, because of stray capacitance and RC time constants related to bias supply resistance and coupling capacitors, it takes an additional finite amount of time, once bias is switched ON, for gated power amplifier 160 to reach its active region. The trigger signal 132a (FIG. 8) output from the transmit pulse trigger 132 is therefore delayed by at least the bias setup time shown in waveform (a) of FIG. 9, allowing the UWB low-level excitation from low-level UWB source 130 to be output only after gated power amplifier 160 reaches the point at which it can produce a full power output, i.e., at point 200.

The power strobe signal shown in waveform (a) of FIG. 9 is removed at point 202, thereby removing the DC power bias conditions applied to gated power amplifier 160 by bias voltage source 150 and primary voltage source 154 only after the UWB signal pulse has propagated through gated power amplifier 160 (typically the width of the UWB signal pulse plus a latency time due to propagation effects within the gated power amplifier 160). The bias in gated power amplifier 160 thereafter decays to a state which removes gated power amplifier 160 from its active, high-power drain region.

Since UWB signals, as generated above, are of extremely short duration (e.g., typically a few hundred picoseconds to a few nanoseconds), it is necessary that the full power bandwidth of gated power amplifier 160 be wide enough to pass the pulses of the UWB signal without excessive distortion. Thus, the full power bandwidth of the gated power amplifier 160 should be approximately equal to the reciprocal of the pulse width of the UWB signal. For instance, for a one nanosecond UWB signal pulse, the full power bandwidth of the gated power amplifier 160 should be at least 1 GHz.

In addition, for optimum power efficiency, the width of the power strobe signal should only be wide enough to enable gated power amplifier 160 to reach steady state and pass the UWB signal pulse without shutting down prematurely. A power strobe width larger than this will increase the amount of power dissipated by the gated power amplifier 160 and thus increase the power consumed by the UWB transmitter.

A high-efficiency power amplifier enhances the ability to implement the UWB transmitter according to the present invention in a portable device. Although the power amplifier 160 need not be gated, the gating of power to the gated power amplifier 160 provides significant power reduction which is particularly useful for battery operated UWB applications in which primary power consumption is a major concern, e.g., hand-held UWB transceivers, battery operated UWB radar sensors, etc.

Class II: Time-Gated Oscillator (TGO) UWB Transmitters

The basis for this class of UWB transmitters is the time-gating of a microwave oscillator with a control signal of short duration to obtain an UWB signal with selected spectral characteristics. This time gating can be accomplished either by utilizing-fast-acting switches, or by switching the microwave signal ON/OFF with a low-level analog or digital signal which approximates an impulse.

FIG. 3 shows an UWB transmitter utilizing a time-gated oscillator source. Time gating circuit 120 controllably gates the output of microwave oscillator 106 to provide an UWB signal. The signal is subsequently filtered by bandpass filter 110 to remove out-of-band energy. The power level of the transmitted UWB signal is controlled by an optional digitally-controlled-attenuator 112, and the resultant signal is subsequently power-amplified for transmission by a gated power amplifier. If digitally controlled attenuator 112 is not used, the UWB signal is fed directly to the gated power amplifier.

Oscillator 106 can be either a fixed frequency or a voltage controlled oscillator (VCO), the latter allowing the center frequency of the UWB source to be changed as desired or on a pulse-by-pulse basis. The particular oscillator used in the L-band embodiment is a 1.5 GHz VCO commercially available from Z-COMM, part no. V602MC01. The microwave oscillator 106 does not need to be very stable particularly when, as in this application, non-coherent communication techniques are utilized. The frequency and/or phase of microwave oscillator 106 can be controlled by signals on frequency/phase control line 104. In this way, the phase component of a modulation scheme can be injected into the UWB signal before transmission. Frequency hopping, which is not possible in prior art UWB transmitters, can be implemented by actively controlling the frequency of oscillator 106.

Accurate control of output power is implemented by digitally controlled attenuator 112 having a 50 ohm impedance providing efficient and predictable power transfer. The particular digitally controlled attenuator 112 used in this embodiment is commercially available from M/A-COM, part no. AT-230.

Time gating circuit 120 gates a continuous wave (CW) phase and/or frequency-controlled signal from oscillator 106 in a tightly controlled manner. Oscillator 106 and time gating circuit 120 form a UWB signal source. Unlike conventional systems, the UWB transmitter according to the present invention does not directly excite an antenna with a high-power impulse signal. Rather, a time-gated UWB source provides well defined output spectral characteristics which can be adjusted as desired to avoid off-limit frequencies.

As described above, a gated power amplifier amplifies the time-gated UWB signal for presentation and radiation from a wideband antenna. To reduce the overall power needs of the UWB transmitter, the power applied to the gated power amplifier may be gated in synchronization with the gating of oscillator 106 performed by time gating circuit 120. Power is applied to the gated power amplifier only during the gated time of the time-gated oscillator UWB source, plus any required ramp-up and latency period. Thus, the gated power amplifier is powered ON a predetermined amount of time prior to the arrival of the UWB pulse (e.g., a few nanoseconds prior to the pulse arrival), and is powered OFF after the UWB signal pulse has passed through. In this fashion, minimal DC power is required to generate the high-power UWB signal. The particular power amplifier used in this embodiment is commercially available from STANFORD MICRODEVICES, part no. SMM-280-4.

The transmitted UWB waveform is not "carrier free" as in conventional systems but instead includes a well-defined and controllable center or carrier frequency established by the frequency of oscillator 106. Moreover, the pulse width of the time gating in time gating circuit 120 controls the instantaneous bandwidth of the radiated UWB signal. Adjustment of the pulse width of time gating circuit 120 correspondingly adjusts the instantaneous bandwidth of the transmitted UWB signal.

Figure 4:
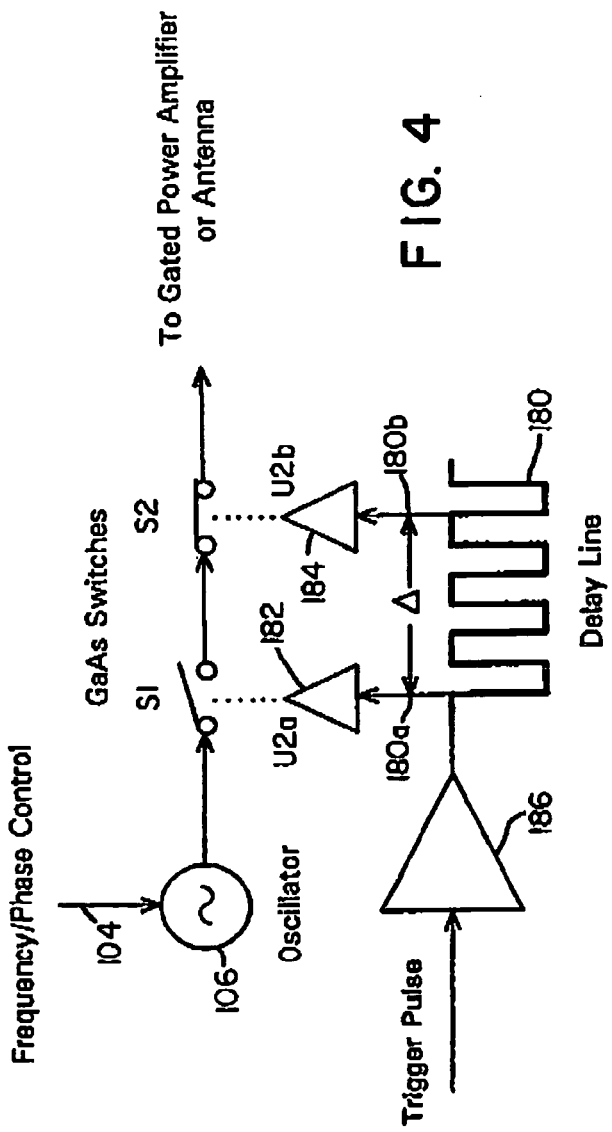
FIG. 4 shows a first embodiment of a time gating circuit using a set of high-speed switches to gate the output from an oscillator.

One embodiment of time gating circuit 120 is shown in FIG. 4, comprising high speed switches S1, S2, and a delay line. High speed switches S1, S2 are GaAs FET switches, though any suitably fast switch can be implemented. The particular GaAs FET switches used in the X-band, 10.0 GHz embodiment are commercially available from Daico, part number DSW25151. The UWB signal could alternatively be gated by a single switch so long as it is suitably fast. For instance, ECL logic might provide suitably fast control of a single GaAs switch. In such a case, the delay line 180 would be unnecessary and the UWB signal waveform would be governed by the rise and fall times of the single switch.

Tapped delay line 180 can be any suitably fast delay circuit. For instance, a delay circuit can be formed from a series of inverter gates. A delay line having sub-nanosecond delay taps was implemented for time gating circuit 120 shown in FIG. 3 by a meandering microstrip line. In this case, the circuit board dielectric constant determines the velocity of propagation of a signal through a length of conductor having predetermined dimensions. Delay line 180 might alternatively be formed by a digitally controllable delay device such as that available commercially from ANALOG DEVICES, part no. AD9501, and others having as little as 10 picosecond (ps) resolution.

In operation, a trigger pulse is sent via buffer 186 to tapped delay line 180 as shown in FIG. 4. Delay line 180 is tapped at a first tap 180a to control switch S1, and at a second tap 180b to control switch S2. When the delayed trigger pulse reaches first tap 180a, it drives buffer 182 which in turn controls switch S1 to close from an open state. Closure of switch S1 allows the output of the oscillator 106 to pass through time gating circuit 120 because switch S2 is already closed at the point in time at which switch S1 closes. After a fixed amount of delay A, while switch S1 is still closed, the trigger pulse reaches second tap 180b and drives buffer 184 which in turn controls switch S2 to open from a closed state. The trigger pulse is a level transition such that when it reaches the second gate 184, the first gate 182 continues to respond to the trigger pulse until after the UWB signal pulse passes. This opening of switch S2 disconnects the output of the oscillator 106 from the output of time gating circuit 120 and thus the output signal drops to zero at that point in time.

Figure 5:
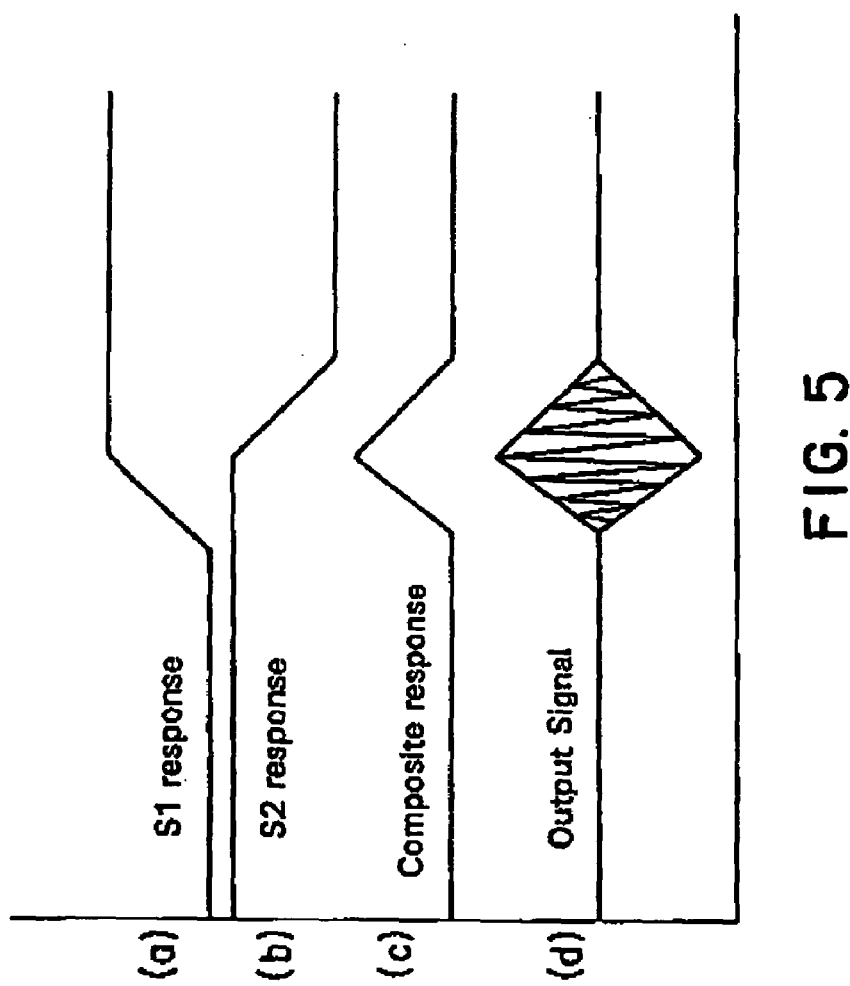
FIG. 5 depicts the response of switches S1 and S2 in FIG. 4.

FIG. 5 shows the response waveform timing of switches S1, S2. Waveform (a) depicts switch S1 being closed and thus allowing the output of oscillator 106 to pass through the time gating circuitry 120. Waveform (b) depicts switch S2 being opened and thus cutting off the output of oscillator 106. Waveform (c) shows the composite result of the response of switches S1 and S2.

Because of the finite rise times of switches S1, S2, (typically a few hundred picoseconds for GaAs switches), the time-gated oscillator UWB output pulse has an amplitude response which is essentially triangular in nature as shown in waveform (d) of FIG. 5. By adjusting the fixed amount of delay A between the operation of switch S1 and the operation of switch S2, and by selecting GaAs FET switches which have fast rise times and closely matched propagation delay times, a sub-nanosecond microwave burst can be generated having a bandwidth as great as several GHz. The shorter the burst, the greater the bandwidth.

If a programmable delay device is used to form delay line 180, the bandwidth of the UWB signal can be adjusted on a real-time basis by adjusting the delay A. In addition, by using an oscillator 106 which can be hopped in frequency, the instantaneous bandwidth and center frequency of the radiated UWB signal can be changed on a pulse-to-pulse basis.

The burst frequency waveform output from the UWB source is non-coherent on a pulse-to-pulse basis. This is acceptable for use with an UWB receiver which can respond to the instantaneous signal energy. Alternatively, the transmitted pulses can be made pulse-to-pulse coherent by deriving the times for operation of switches S1 and S2 from the oscillator frequency through a digital pre-scaler and divider. Thus, phase shift keying (PSK), or the phase component of quadrature amplitude modulation (QAM) can be implemented. Amplitude shift keying (ASK) can be implemented by the presence or absence of a pulse, or pulse position modulation (PPM) can be implemented. Any modulation scheme utilizing phase and/or amplitude can be implemented.

Figure 7A:
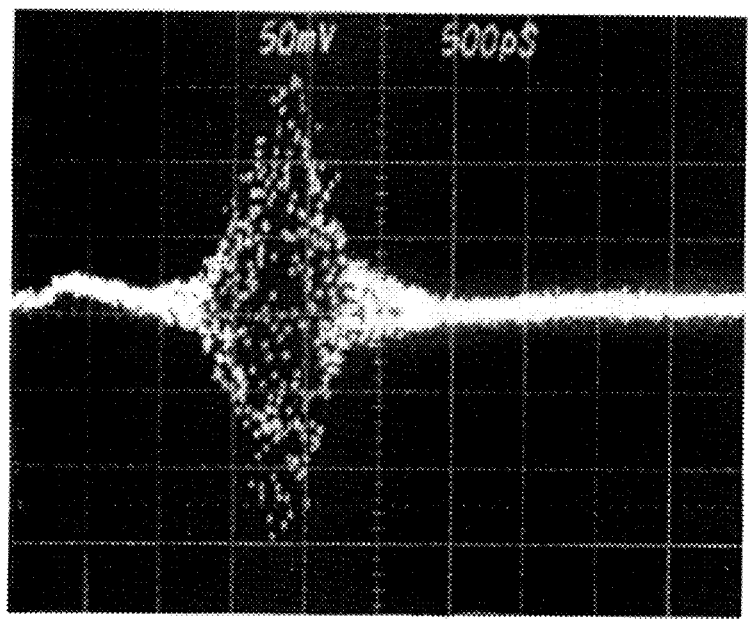
FIGS. 7A and 7B show an X-band UWB signal generated by the time-gated UWB transmitter shown in FIG. 4.

FIG. 7A shows an actual transmitted UWB signal generated by an X-band time-gated oscillator according to the embodiment shown in FIG. 4. This particular UWB signal was generated with an X-band microwave oscillator 106 comprising a 2.5 GHz VCO step recovery diode source multiplied up by four to form a 10 GHz source. A time-gating pulse of 500 picosecond (ps) duration was used. As shown in FIG. 7A, the pulse from time gating circuit 102 was approximately triangularly-shaped. The resultant X-band UWB signal had a 3 dB down bandwidth of over 2 GHz.

Figure 7B:
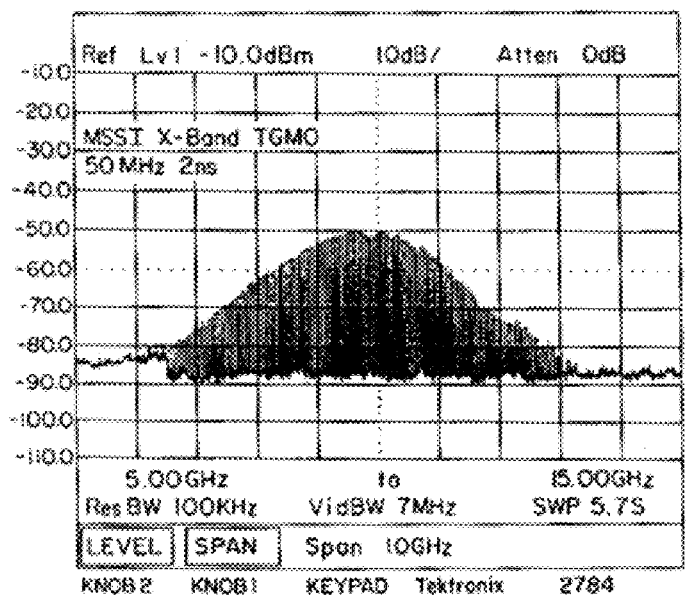

FIG. 7B shows the frequency spectrum of the UWB signal shown in FIG. 7A. Note that the shape of the frequency spectrum is affected by the shape of the response pulse in the time gating circuit 120.

Figure 6:
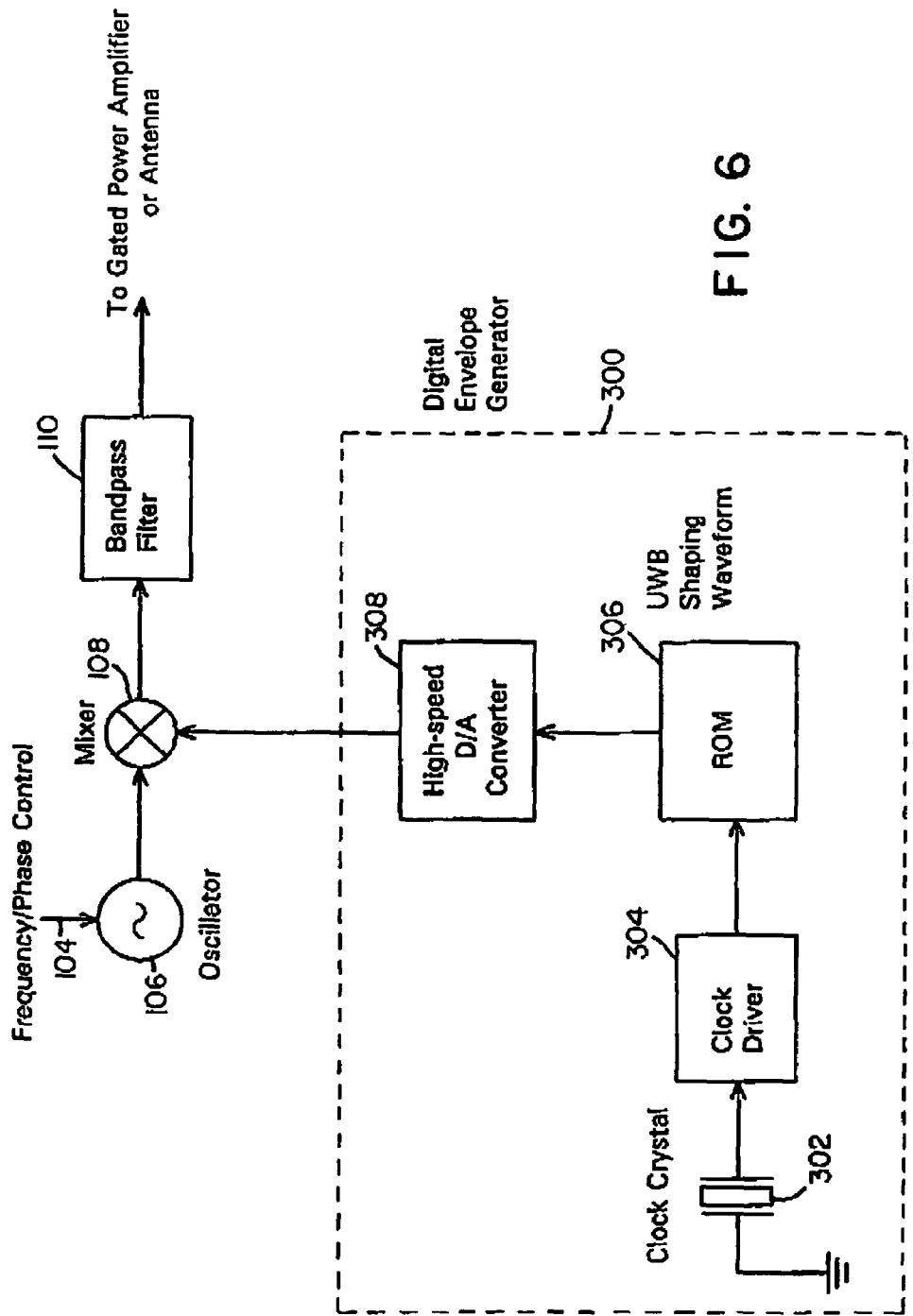
FIG. 6 shows an embodiment of a time-gated UWB transmitter using digital pulse shaping.

FIG. 6 shows an embodiment of a time-gated oscillator UWB transmitter made practical by the availability of high-speed programmable logic and D/A converters. In this embodiment, a digital envelope generator circuit 300 is used to form the time gating circuit 120.

A clock crystal 302 drives a clock driver 304 to output sequential addresses to high-speed read only memory (ROM) 306. The ROM 306 could ideally be a bank of ROMs triggered sequentially to accelerate the speed of the relatively slow memory. The speed of the data output from the bank of ROMs 306 corresponds to the speed of clock crystal 302. The data clocked out of ROM 306 is converted to an analog signal by a high-speed D/A converter 308, and thereafter input to mixer 108 as a gating pulse.

ROM 306 is programmed with the desired UWB waveform shape, and thus forms a lookup table having data which is converted from digital form to analog form by the D/A converter 308. In the real world, mixer 108 is not perfectly linear, and thus shaping the analog excitation pulse from the D/A converter 308 will shape the output UWB signal. The preferred waveform shape stored in ROM 306 is determined empirically based on a desired UWB output spectral waveform.

Digital envelope generator circuit 300 provides an analog modulation function for mixer 108, and thus AM-modulates the "carrier" signal from the oscillator 106.

While the transmitter embodiment of the invention has been described with reference to the exemplary preferred embodiments thereof, those skilled in the art will be able to make the various modifications to the described embodiments of the invention without departing from the true spirit and scope of the invention. For instance, the invention is applicable for use by oscillators of any frequency as appropriate to the application. Moreover, it is within the scope of the present invention to implement the analog components digitally as appropriate to the application. For instance, a suitably fast digital signal processor can replace the oscillator, low-level impulse generator, filter, delay line, switch and/or control logic. For the sake of convenient reference, the circuits and methods for altering, conditioning, adapting, filtering, pulse shaping, and/or controlling a low-level UWB pulses or impulse sources, including the setting, regulating or controlling of bandwidth, frequency, phase, multi-level attenuation/amplitude, etc., are herein referred to as waveform adapting or adaptation, or performed by a waveform adapter.

DESCRIPTION OF ILLUSTRATIVE RECEIVER EMBODIMENTS

The tunnel diode detector circuitry and process steps of the present invention provide an UWB receiver which is highly immune to many forms of in-band jamming; can operate at extremely high data rates (tens to hundreds of megabits per second MB/s); and provides a high speed threshold which compensates for the level of noise and guarantees a desired ROC performance. A TDD UWB receiver using this technique provides single pulse detection of a 200 μW (average power) UWB signal at distances exceeding 50 miles.

Figure 19A:
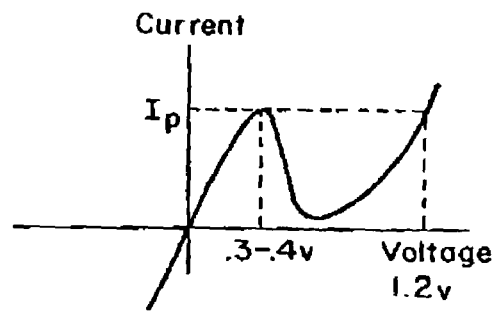
FIGS. 19A to 19C show the current-to-voltage (I-V) characteristics of a tunnel diode (FIG. 19A), a Schottky Diode (FIG. 19B) and a back tunnel diode (FIG. 19C), respectively.
Figure 19B:
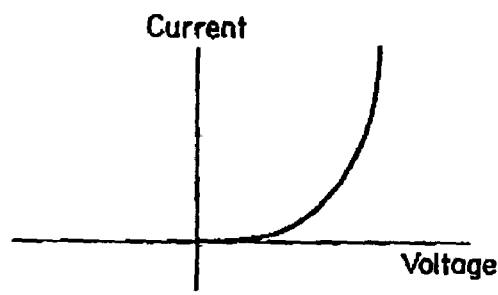
Figure 19C:
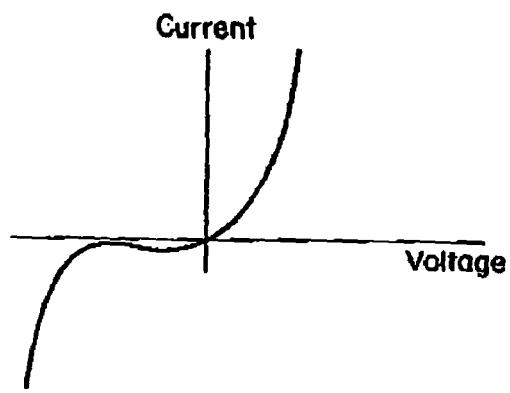

The tunnel diode(s) of the UWB receiver is (are) biased to operate near its peak current value $I_P$, which occurs just prior to the tunnel diode's AC negative resistance region as shown in FIG. 19A. This is in sharp contrast to the operation of a conventional microwave Schottky diode detector as shown in FIG. 19B, or a conventional back tunnel diode detector as shown in FIG. 19C, which rely on signal rectification with low or zero offset voltages for the detection of low level microwave signals.

The tunnel diode detector integrates directly the received voltage (current times input impedance) over the dwell interval. Since the integral of white Gaussian noise is equivalent to Brownian motion (also called a Wiener process after the mathematician Norbert Wiener), the tunnel diode detector transforms noise statistics in such a manner that the smaller the dwell interval, the larger the available signal-to-noise ratio. (Gikhman, I. I. et al. *Introduction to the Theory of Random Processes*, Dover Publications, New York (1969).

The detector according to the present invention achieves high processing gain without resorting to the coherent addition of multiple pulses required by other designs such as those disclosed by U.S. Pat. Nos. 5,523,760, 4,979,186, and 5,363,108. Moreover, unlike previous receiver designs that were limited to data rates of approximately 20 Kb/s (kilobit/second) for voice and data communications as well as radar applications, the UWB receiver according to the present invention is capable of data rates in the multiple Mb/s (megabit/second) range. This high speed operation enables full duplex or two-way transmission and reception of stereo quality voice, video imagery and other data rate critical applications.

Figure 13:
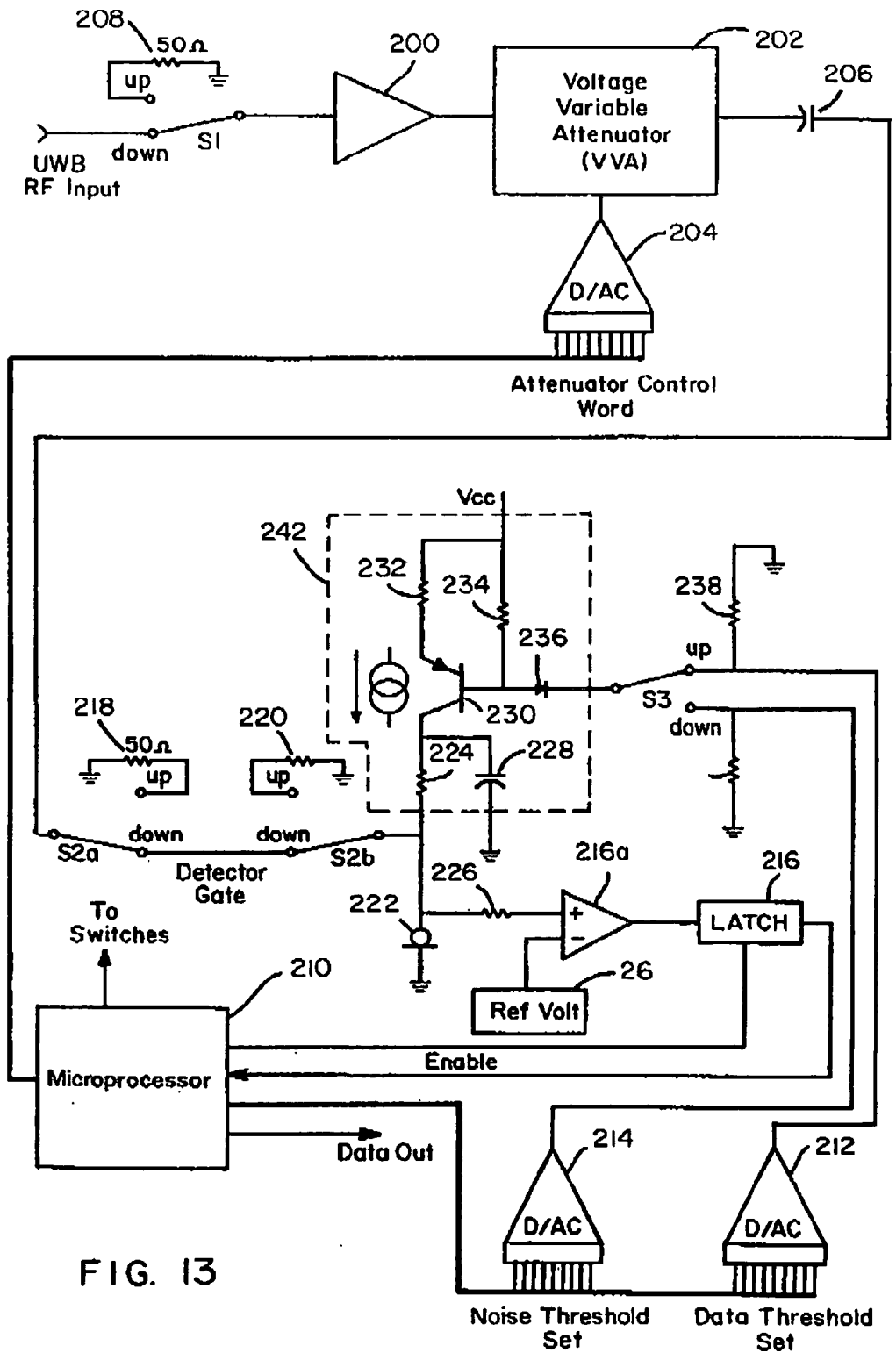
FIG. 13 is a schematic diagram of a high data rate UWB receiver according to a first embodiment of the present invention.

FIG. 13 shows a simplified schematic diagram of a first embodiment of a high speed UWB receiver according to the present invention. In FIG. 13, a received UWB pulse is input, through calibration switch S1, to a wideband, high gain RF amplifier 200. Calibration switch S1 is used to switch between an operational mode with switch S1 in the down position as shown in FIG. 13, and a calibration mode with switch S1 in the up position connecting the input of high gain RF amplifier 200 to ground through impedance matching resistor 208, which in this embodiment is 50 ohms. In the preferred mode, calibration switch S1 is switched only once after power-up and is activated by a programmable logic device or microprocessor 210.

Receiver 'Operational Mode'

With calibration switch S1 in the operation mode position, after RF amplification, the UWB pulse is input to voltage variable attenuator (VVA) 202, whose primary function is to provide high speed, adaptive dynamic range extension. The adaptive dynamic range extension process is particularly useful in the presence of in-band interference and noise.

According to the process, the attenuation of VVA 202 is adjusted, under microprocessor control, by the output of a digital-to-analog converter (DAC) 204. A ten bit DAC is sufficient for the purposes of DAC 204, although a 12 bit DAC is preferred to provide a greater margin for error. The DAC 204 settling time should be fast enough to provide adequate and timely control of the VVA 202 before the next gate change. As an example, for a 10 Mb/s data rate, the DAC 204 settling time should be less than approximately 100 ns. A slower DAC 204 can be used if some hysteresis is tolerable in the VVA 202 control setting.

The UWB signal is attenuated based on an instantaneous measurement of noise, allowing the tunnel diode detector to be maintained at its peak current value to provide maximum sensitivity, rather than the conventional method of backing-off the bias current of the tunnel diode detector based on the presence of noise. The particular VVA 202 used provides a 60 dB attenuation range, and is ideally linear. Significant non-linearities in the VVA 202 are compensated in the microprocessor 210 through corresponding control of DAC 204. To obtain a desired range of attenuation, multiple VVAs may be cascaded. For instance, two 30 dB VVAs may be cascaded to obtain 60 dB range of attenuation, or two 40 dB VVAs may be cascaded to obtain 80 dB range of attenuation.

Alternatively, a digitally-controlled microwave step attenuator may be substituted for the VVA 202. A step attenuator implements a set of discrete attenuation levels versus the continuum of levels achievable with VVA 202. Thus, it would have somewhat decreased performance in the presence of jamming and impulsive noise due to quantizing effects in achieving the desired operating bias. Although 2 dB increments have been implemented, the difference in the attenuation between levels of the step attenuator is preferably 0.5 dB or less.

The amplified, and VVA-attenuated, UWB pulse is subsequently fed via capacitor 206 to a detector gate formed by switch sections S2a, S2b and resistors 218, 220. Switch sections S2a and S2b act in tandem to alternatively apply and remove the conditioned microwave UWB pulse from the input terminal of a tunnel diode detector 222. When switch sections S2a and S2b are both in the DOWN position (as shown in FIG. 13), the UWB pulse is applied to tunnel diode detector 222. When both switch sections S2a, S2b are in the UP position, resistor 218 terminates the output of the amplifier 200/VVA 202 chain to prevent any potential instabilities due to a standing wave ratio (SWR) mismatch. At the same time, switch S2b shorts resistor 220 across tunnel diode detector 222 to remove any stored charge. The particular tunnel diode detector 222 used was obtained from GERMANIUM POWER DEVICES CORP. in Andover, Mass., Model No. TD272A.

Resistor 220 used with the disclosed embodiment has a value of 10 ohms which is selected to be sufficiently low to reset the tunnel diode detector 222 without causing significant current unbalance in the constant current source. The power source Vcc was 3.3 volts, although any conventional voltage supply level may be implemented with appropriate circuit component families.

A voltage-controlled constant current source 242 controls the bias on tunnel diode 222. Constant current source 242 includes transistor 230, resistors 224, 232 and 234, filtering capacitor 228, and protection diode 236. Transistor 230 is a Model No. 2N3906, resistor 224 has a value of 100 ohms, and filtering capacitor 228 has a capacity of 33 picofarads.

Switch S3 selects the voltage control mode of constant current source 242. In the UP position as shown in FIG. 13, switch S3 selects a 'Data Threshold' voltage control mode which sets the tunnel diode bias of the tunnel diode detector 222 for data detection during data dwells. The 'Data Threshold' mode is used to set the bias of tunnel diode detector 222 to the correct sensitivity portion of its voltage-current (V-I) characteristics for the detection of an UWB pulse, based on the desired BER. The data threshold setting circuit comprises resistor 238 and digital-to-analog converter (DAC) 212. Switches S2 and S3 are controlled by a high speed programmable logic device (not shown) which can either have its own oscillator or clock, or share an oscillator or clock with microprocessor 210.

Ten-bit DACs are sufficient for DACs 212 and 214, though twelve bit DACs provide a greater margin for error. DACs 212 and 214 are preferably set only once, during a calibration routine, and are not changed thereafter. The particular DACs 212, 214 used in the disclosed embodiments are LINEAR TECHNOLOGIES, Model No. LTC1453, which have a serial input. Of course, parallel input DACs may be implemented instead of serial input DACs.

In the DOWN position, switch S3 selects a 'Noise Threshold' voltage control mode which utilizes resistor 240 and DAC 214. The 'Noise Threshold' mode is used to set the bias of tunnel diode detector 222 to the correct sensitivity portion of its V-I characteristics for measuring either internal or external noise power. Switches S1, S2 and S3 are preferably suitably fast semiconductor switches, e.g., Gallium Arsenide (GaAs) semiconductor switches having low insertion loss at microwave frequencies. The particular switches used are available from MINI CIRCUITS, Model No. YSW-2-50dR.

During a dwell, when sufficient charge accumulates at the terminals of tunnel diode detector 222, it changes state thereby causing a voltage swing to occur across its terminals. Resistor 226 couples this voltage swing to a comparator latch 216 which includes comparator 216a, shown separately in FIG. 13 for clarity. A separate comparator could alternatively be implemented. A reference voltage source 260 applied to the negative input of the comparator is set to about 250 millivolts so that latch 216 detects and latches voltages above this reference voltage. Latch 216 generates a digital CMOS-compatible voltage signal for subsequent processing by a microprocessor 210. Any logic family may be utilized using appropriate output levels, e.g., TTL, ECL, etc. The particular comparator latch 216 used is a Model No. AD9696.

A noise dwell is defined to be the state in which the detector gate formed by switch S2 shown in FIG. 13 is enabled, i.e., in the DOWN position, and the threshold select switch S3 is in the 'Noise Mode' or DOWN position to select the Noise Threshold DAC 214. A Data Dwell is defined as the state in which switch S2 is in the enabled or DOWN position, and the threshold select switch S3 is in the 'Data Mode' or UP position to select the Data Threshold DAC 212. The frequency of data dwells is related to the signaling rate. For maximum speed, the number of noise dwells per data dwell is minimized, but in the preferred embodiment at least two noise dwells are required for each data dwell. In lower speed applications, accuracy can be improved by performing an increased number of noise dwells for each data dwell. For instance, in one application of the present invention, a 128 Kb/s data rate was implemented with forty noise dwells for each data dwell.

Figure 14:
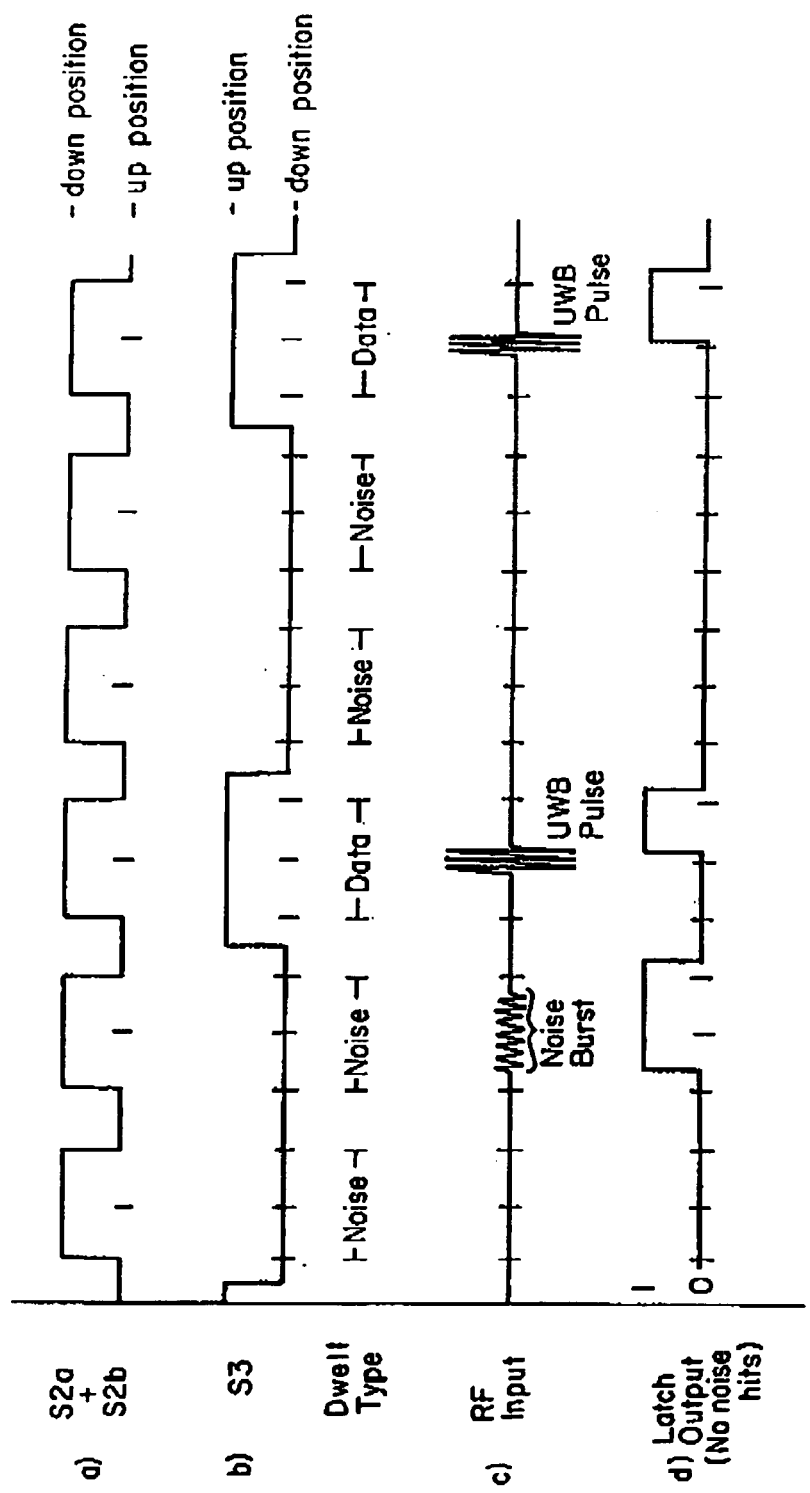
FIG. 14 is a timing diagram showing the operation of switches S1 to S3 in FIG. 13 with respect to an UWB received pulse, e.g., timing for two noise dwells per data dwell.

FIG. 14 is a timing diagram showing the operation of switches S2, S3 and latch 216 in the embodiment of FIG. 13 with respect to the RF input. FIG. 14 emphasizes the timing of switches S1 to S3 and is not drawn to scale. Waveform (a) of FIG. 14 shows the timing of data and noise dwells, with the dwell occurring when S2 (S2a and S2b) is in the down position. The type of dwell is defined by the position of switch S3 as shown in waveform (b). As shown in FIG. 14, two noise dwells are performed before each data dwell. Waveform (c) shows the position of the UWB pulse in the RF input, as well as a noise burst, with respect to the noise and data dwells. Waveform (d) shows the latching of both noise and data.

Receiver 'Calibration Mode'

To achieve high sensitivity for single pulse operation, it is important to calibrate the tunnel diode detector's 'Data Threshold' and 'Noise Threshold' settings. According to one embodiment of the present invention, the Data Threshold and Noise Threshold are established only once after power-up.

A method of calibration comprises the following steps:

1. Terminate the Receiver Front End into a Matched Impedance.

This is accomplished in the present embodiment by placing switch S1 in the UP position as shown in FIG. 13. A 50 Ω input termination permits calibration of tunnel diode detector 222 in the presence of only internally generated noise sources, e.g., detector shot noise, amplifier chain thermal noise (kTBF), etc.

2. Attenuate the Amplified UWB Input Approximately 3 dB.

The amplified UWB input is attenuated in the present embodiment by the voltage variable attenuator (VVA) 202. An attenuation setting of X dB allows for drift in the receive amplifier chain (e.g., due to ambient temperature fluctuations, device aging, etc.) which could produce up to an X dB decrease in system gain. It has been found experimentally that a setting of approximately 3 dB is adequate for system gains of as much as 60 dB and over commercial temperature ranges (e.g., 0 to +70° C.).

3. Adjust Noise Threshold to Determine the 'Noise CAL' Setting.

The Noise Threshold setting is set before the Data Threshold setting. This is accomplished in the present embodiment shown in FIG. 13 by setting Threshold Select switch S3 to the DOWN or 'Noise Threshold Set' position to select the 'Noise Threshold' mode. Then, by performing noise dwells and subsequently adjusting DAC 214 under microprocessor control until approximately 50% of the noise dwells contain noise hits. This is the 'Noise CAL' setting for the tunnel diode detector 222.

4. Adjust Data Threshold to Determine the 'Data CAL' Setting.

The data threshold is adjusted by setting the Threshold Select switch S3 to the UP or 'Data Threshold Set' position to select the 'Data Threshold' mode. The data threshold is then adjusted by controlling DAC 214 so that one hit out of 1/(2*BER) hits occurs, where BER is the desired bit error rate. A 'hit' is an event latched by latch 216. As an example, if a BER of $10^{-3}$ is desired, adjust the data threshold so that only one hit is latched by latch 216 during the performance of 2000 data dwells. Thus, to determine the setting in this example at least 2000 data dwells are performed. To confirm a correct setting, an iterative process can be performed wherein as many as dozens of sets of dwell sequences are performed to achieve the desired data threshold level. To confirm a data threshold level it is useful to perform a number of sets of data dwell sequences, e.g., ten sets of 2000 data dwells, to ensure that the data threshold is set at a level which will achieve the desired BER.

5. Remove the Matched Impedance Termination and Connect the Receiver Front End to the Antenna.

In the present embodiment, this is accomplished by switching switch S1 to the down position as shown in FIG. 13.

6. Determine Attenuation Value Corresponding to 50% Noise Hits.

The 50% noise hits value is the point at which there is a 50% probability that noise will exceed the Noise Threshold. This is performed by holding the Noise Threshold of the present embodiment fixed at the Noise CAL setting, and by performing a sequence of noise dwells. The VVA 202 is adjusted to obtain approximately five out of ten noise hits (50%), and the DAC 204 setting is saved as 'VVA0.5'.

7. Determine Attenuation Value Corresponding to a Level Above 50%, e.g., 70% Noise Hits.

Maintaining the Noise CAL setting fixed, decrease the attenuation of VVA 202 (i.e., providing increased sensitivity) until the tunnel diode detector 222 registers approximately seven out of ten noise hits (70%), and save the DAC 204 setting as 'VVA0.7'.

8. Determine Attenuation Value Corresponding to a Level Below 50%, e.g., 30% Noise Hits.

Again maintaining the Noise CAL setting fixed, increase the attenuation of the VVA 202 (i.e., providing less sensitivity) until the tunnel diode detector 222 registers approximately three out of ten noise hits (30%), and save the DAC 204 setting as 'VVA0.3'.

Steps 6–8 may be performed in any order. Moreover, the particular values 30%, 50% and 70% can just as easily be other comparable values, e.g. 20%, 50% and 80%, or 10%, 50% and 90%. Ideally, the calibration cycles will mimic the operating conditions.

9. Calculate a Minimum Attenuator Step Size S Required for Noise/Interference Threshold Tracking from the Equation:

$$S=\min(|VVA_{0.7}-VVA_{0.5}|,|VVA_{0.5}-VVA_{0.3}|).$$

Too small a step size increases detector tracking response time, while too large a step size results in over/undershoot of the system sensitivity response characteristic which increases the attainable bit error rate. If using a step attenuator, the minimum step size should ideally correspond substantially to an integer multiple of the step size of the attenuator itself.

The Data Threshold is usually set higher than the Noise Threshold. Properly adjusted, the probability that a latched UWB data signal will be greater than the Data Threshold is great, with the probability of a false alarm due to noise being very low and based on the desired BER. In operation, the probability of noise is kept constant by adjustment of the DAC 204, and thus the probability of data being greater than the Data Threshold (i.e., the probability of a false alarm) is indirectly kept constant.

Figure 15:
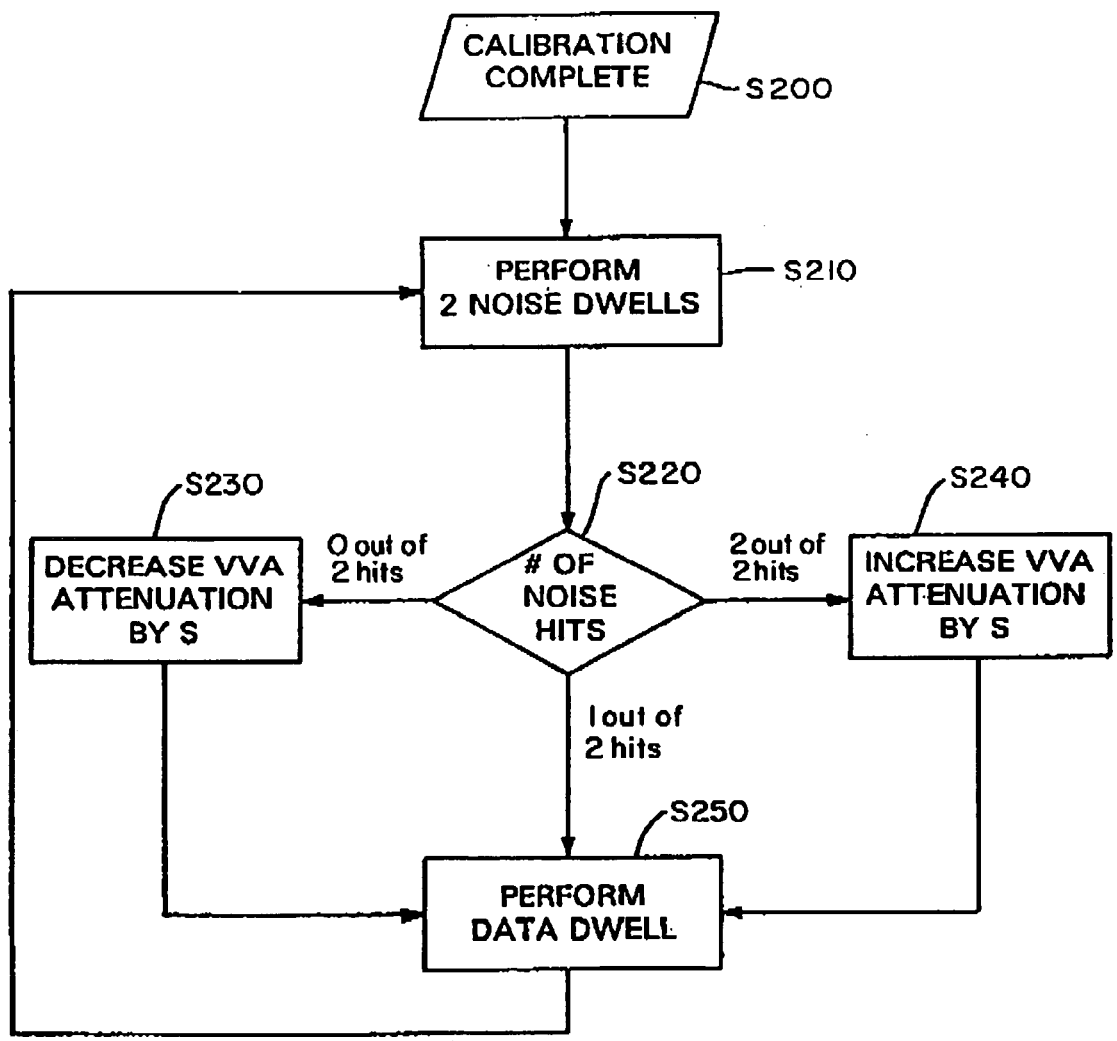
FIG. 15 is a flow diagram for the tunnel diode detector UWB receiver according to the present invention.

Operation of the tunnel diode detector 222 of the present embodiment during signal reception occurs as shown in the flow chart of FIG. 15 with general reference to FIG. 13.

The UWB receiver is initially and generally calibrated only once, preferably after power-up, as shown in step S200 of FIG. 15. Of course, the UWB receiver may be calibrated more than once, but need not be.

After calibration, at least two noise dwells are performed before each data dwell as shown in step S210.

In step S220, the number of noise hits, i.e., a detection event latched by latch 216, is determined from the two noise dwells performed in step S210. Of course, more than two noise dwells may be performed and a percentage of 'hits' may be acted on rather than on an absolute number of hits as shown in step S220 in FIG. 15. However, to maximize data rates, as few as two noise dwells provide satisfactory results.

If neither of the two noise dwells performed in step S210 resulted in a 'hit', then step S230 is performed to decrease the VVA 202 attenuation by the step increment S, and then the data dwell is performed as shown in step S250. If one of the two noise dwells resulted in a 'hit', then the data dwell is performed as shown in step S250 without any change in the attenuation of the VVA 202. In this instance, the noise detection would appear to have the desired probability of 50%. If both noise dwells performed in step S210 resulted in a 'hit', then step S240 is performed to increase the VVA 202 attenuation by the step increment S before performing the data dwell in step S250.

In conventional CFAR-based designs, a false alarm rate calculation requiring a large number of noise dwells was performed continuously, thereby reducing the allowable data rate significantly. In contrast, the present invention requires only two noise dwells to reliably determine whether to remove or insert additional attenuation of the amplified UWB pulse prior to detection by the tunnel diode detector 222. Accordingly, the sensitivity of tunnel diode detector 222 (which is effectively set by the combination of the Data Threshold and VVA attenuation values) can track changes in the noise and/or interference level at a much faster rate than conventional systems.

Figure 16:
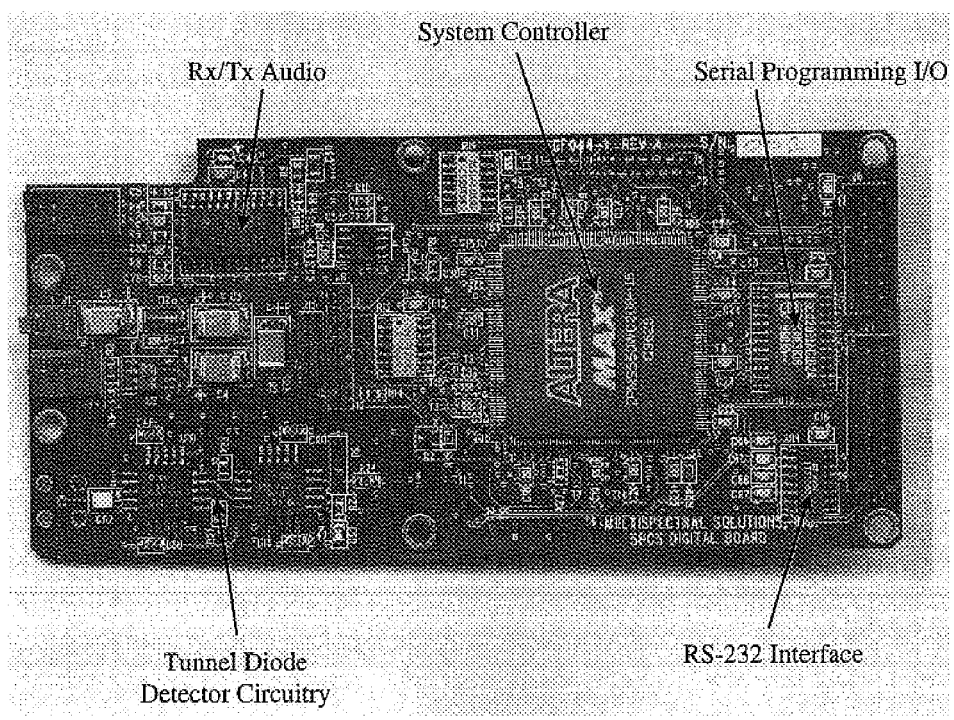
FIG. 16 is a photograph of a circuit board of a transceiver utilizing the present invention.

FIG. 16 shows the UWB receiver imbedded in a full duplex, voice/data ultra wideband transceiver. The RF section of this particular unit (lower left hand side) is wideband from a few MHz to beyond 4 GHz. Tunnel diodes with adequate response characteristics to 26 GHz and beyond are currently available, and thus the UWB receiver can readily accommodate a wide variety of center frequencies between a few MHz upwards toward 26 GHz.

During synchronization, the data dwell is time-shifted to initially acquire the signal for timing. During time-shifting, a window is moved a given number of clock cycles between data dwells until the data is detected. For example, a data dwell having a window of 62.5 nanoseconds is performed and analyzed to determine if data was detected. If not, the window is moved ⅛ of the width, i.e., 7.8333 ns, until the data is detected. Of course, other movement amounts are possible. Time-shifting of the data dwell is stopped when enough of a sync signal is detected to identify the signal. In the disclosed embodiment, a 40 bit sync signal was used with a 128 Kb/s signal wherein detection of six bits is sufficient for identification of the signal. The window is constantly adjusted by the microprocessor 210 to ensure that the data is in the center of the window. A programmable logic device (PLD) could be implemented instead of using microprocessor 210 to perform the time-shifting of the data dwell.

During a 'scan mode' in which the data dwell is essentially looking for a pulse, it is possible that a data pulse might occur during a noise dwell. That is, during the time at which synchronization to the data dwell intervals has not yet been completely achieved, the detected noise may include data. If the ratio of the number of noise dwells with respect to each data dwell is large (for example, greater that 32-to-1), a few data hits occurring during the noise dwells will not impact the threshold attenuation setting significantly. However, as this ratio becomes smaller, the number of data hits occurring during noise dwell intervals will eventually become sufficiently large so that the process will erroneously and unnecessarily reduce the UWB receiver sensitivity by increasing the attenuation setting of VVA 202. This action, in turn, will make initial signal acquisition more difficult because of reduced signal amplitude. That is, the data itself acts as a noise source, causing receiver sensitivity to be reduced to eliminate its effects.

Figure 17A:
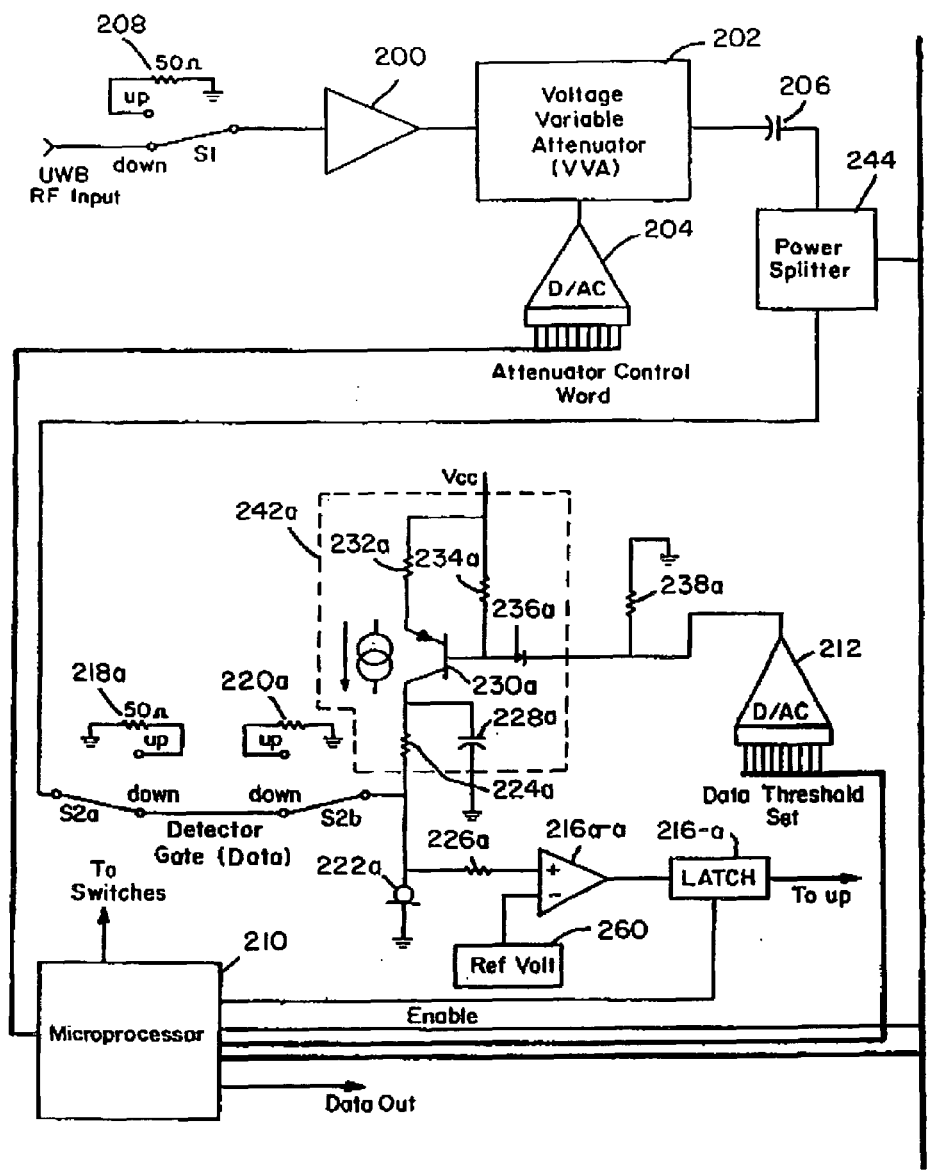
FIG. 17 is a schematic diagram of an ultra high data rate UWB receiver according to a second embodiment of the present invention.
Figure 17B:
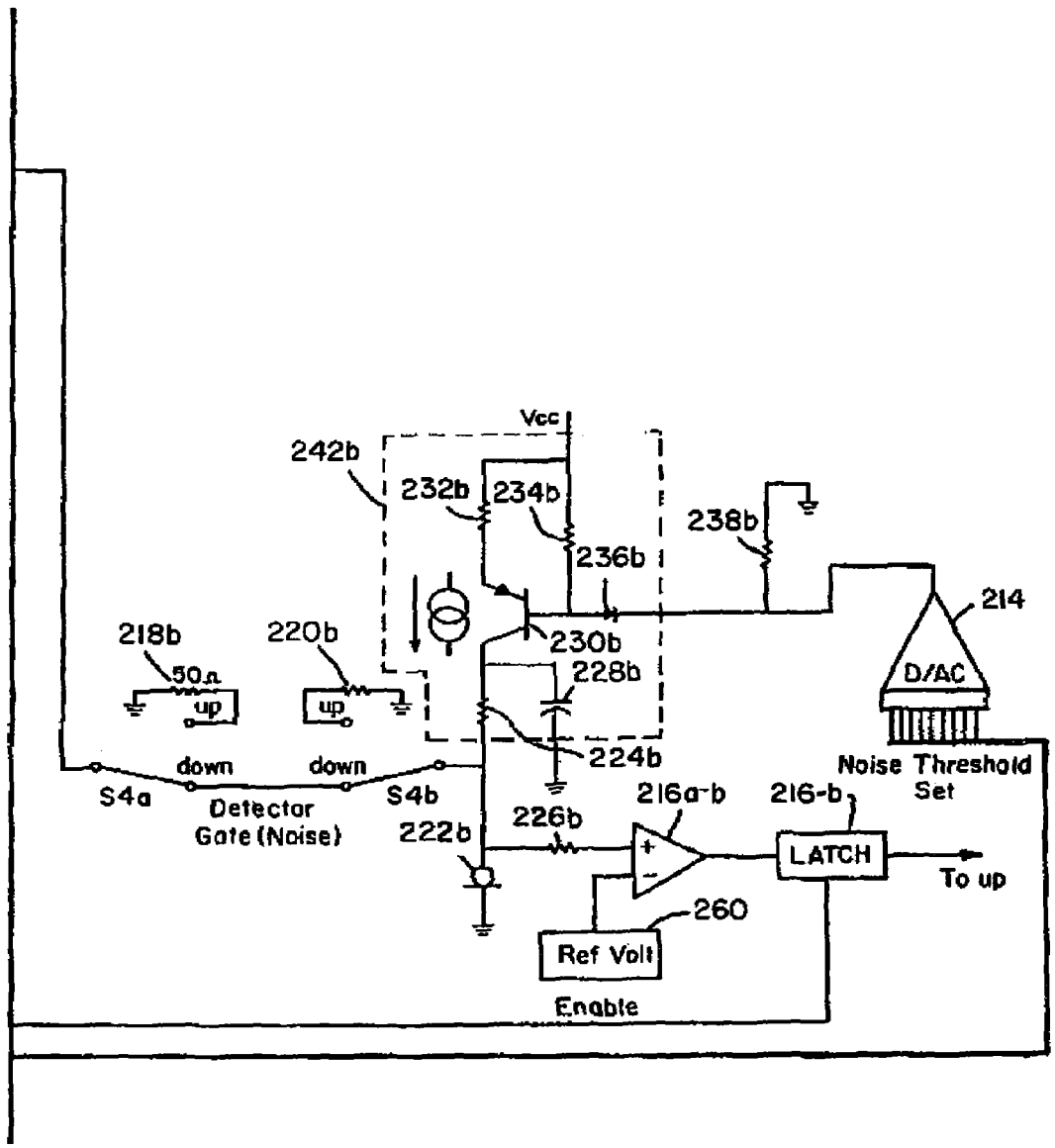

This problem can be overcome by a second embodiment of the present invention as shown in FIG. 17, which utilizes two tunnel diode detectors to allow for parallel data and noise dwells, thus allowing for even higher speed operation than that allowed by the single tunnel diode detector embodiment shown in FIG. 13. In this embodiment, all dwells are both data dwells and noise dwells.

In an UWB receiver utilizing a single tunnel diode detector, the maximum number of noise dwells that can occur for each data dwell is reduced as the data rate increases. The UWB receiver having two tunnel diode detectors—one for the detection of energy with respect to a noise threshold and the other for the detection of energy with respect to a data threshold, e.g. as shown in FIG. 17, has certain advantages over a single tunnel diode 222 design switched between a noise threshold and a data threshold as shown in FIG. 13. For instance, in a single tunnel diode design, as the data rate increases, the time between data dwells correspondingly decreases, reducing the number of noise dwells which can be performed. The use of two tunnel diode detectors as shown in the embodiment of FIG. 17 eliminates the correspondence between an increase in the data rate and a reduction in the number of noise dwells.

In FIG. 17, the UWB RF signal, after amplification and adaptive VVA-attenuation as disclosed herein above, is split into two paths using a wideband power splitter 244—one path for data processing with a first tunnel diode detector 222a and the second path for noise processing with a second tunnel diode detector 222b. Each of the individual detector gates S2a/S2b, S4a/S4b, constant current sources 242a, 242b, latches 216a, 216b, digital-to-analog converters, 204, 212, 214, and various resistors, capacitors and other components are as described above with respect to FIG. 13 but duplicated as shown for use with two tunnel diode detectors. Two independent tunnel diode detectors 222a, 222b are provided so that noise and data intervals are kept physically separate and thus can operate autonomously. This permits parallel, simultaneous processing of a data signal path and a noise signal path based respectively on a calibrated data threshold and a noise threshold but based jointly on the attenuation of a common signal attenuation element.

During every dwell, the embodiment of FIG. 17 can determine whether the received energy satisfies any one of the following conditions:

1. The received energy is less than the noise threshold as detected by tunnel diode detector 222b;
2. The received energy exceeds the noise threshold but is less than the data threshold based on detection results of both tunnel diode detectors 222a and 222b; or
3. The received energy is greater than both the noise and data thresholds.

By determining which condition is met during the scan mode, the UWB receiver's microprocessor 210 can discriminate between a noise or data hit during each dwell, and adjust the level of attenuation in the VVA 202 accordingly. This is a significant advantage over the single detector circuit, e.g., as shown in FIG. 13, which can only determine conditions (1) and part of (3), i.e., whether the energy exceeded the noise threshold during a noise dwell, or whether the energy exceeded the data threshold during a data dwell. In the embodiment of FIG. 13, because only one bias is applied to the single tunnel diode detector 222 at any one time, the condition (2) cannot be determined with certainty. However, this additional information can be determined by using two separate tunnel diode detectors 222a, 222b as shown in FIG. 17. The two tunnel diode detectors 222a, 222b do not need to be matched because each is calibrated separately.

If more than one dwell is performed for each data bit period, then during these X number of dwells, at most a single hit exceeding the data threshold should occur due to data. Thus, if two or more hits exceed the data threshold in a single bit period, it is presumed that at least one of these hits must be due to noise or interference. In the embodiment of FIG. 17, the independent noise tracking process makes a corresponding reduction in the sensitivity of the receiver by increasing the attenuation of VVA 202 in this instance. The step size for this reduction can be determined during threshold calibration using techniques similar to those described herein above.

Figure 18:
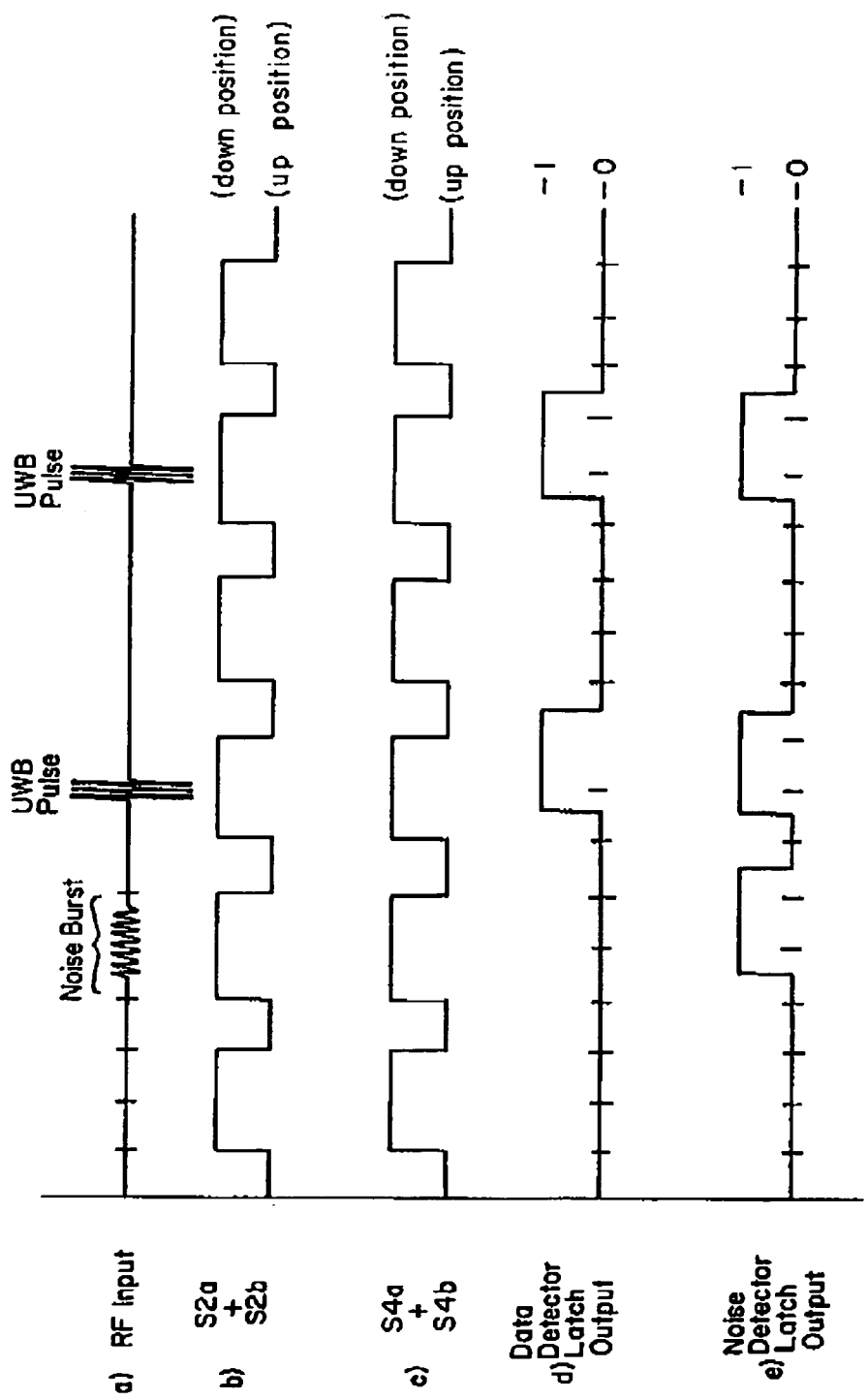
FIG. 18 is a timing diagram of the circuit of FIG. 17.

The timing of switches S2 and S4, and latches 216 of the embodiment of FIG. 17 is shown in FIG. 18. Waveform (a) in FIG. 18 shows the RF input including a noise burst. Waveforms (b) and (c) show that all dwells are both data and noise dwells. Waveform (d) shows that data is latched if present during the dwells, while noise is latched if present by the noise detector latch 216 but not by the data detector latch 216 as shown in waveform (e). Thus, the noise burst can be distinguished and does not cause a false alarm.

UWB transmitters are disclosed in a U.S. patent application filed on May 16, 1997 entitled "Frequency Adaptive Ultra-wideband Transmitter" by Larrick, Jr. et al., and commonly owned with the present application. This U.S. Application is explicitly incorporated herein by reference.

While the invention has been described with reference to the exemplary preferred embodiments thereof, those skilled in the art will be able to make various modifications to the described embodiments of the invention without departing from the true spirit and scope of the invention which includes, without limitation, a method of detecting an object by generating a switched impulse, low-level ultra-wideband signal; waveform adapting the switched impulse, low-level ultra-wideband signal; and transmitting the signal and receiving a reflected pulse from an object representative of the waveform-adapted, ultra-wideband signal.

The invention claimed is:

1. A range measuring device comprising an ultra-wideband (UWB) transmitter and receiver, said device comprising:
    a switched impulse generator to generate a low-level waveform adaptive ultra-wideband signal comprised of a low-level UWB energy pulse,
    a wave filter that filters said low-level UWB energy pulse to define a center frequency thereof and to produce a filtered low-level UWB energy pulse having a given bandwidth and center-frequency;
    an antenna responsive to said wave filter to radiate a transmitted signal representing said filtered low-level UWB energy pulse; and
    a receiver that receives a representation of the transmitted signal reflected from an object after the antenna completes radiating the transmitted signal.

2. The range measuring device as recited in claim 1, wherein said receiver comprises at least one tunnel diode responsive to an echo pulse.

3. The range measuring device as recited in claim 1, further comprising an amplifier that amplifies said filtered low-level ultra-wideband energy pulse.

4. The range measuring device of claim 3, wherein said wave filter comprises one of a band-pass filter and a pulse shaper.

5. The range measuring device of claim 1 wherein said wave filter defines a bandwidth of the signal radiated by the antenna to reduce out-of-band emissions radiated by said antenna.

6. The range measuring device of claim 1, wherein the receiver includes:
    a variable attenuator coupled to a receiving antenna to adjust attenuation levels thereof based on a rate of error detection of the radiated ultra-wideband signal received at said receiver; and
    a detector to detect an output of said variable attenuator.

7. The range measuring device of claim 6, wherein said detector comprises a tunnel diode and said variable attenuator adjusts said attenuation by alternately applying noise and received information signals to said tunnel diode.

8. The range measuring device of claim 7, further including a controller that digitally controls the variable attenuator according to signals received during respective noise dwells and data dwells to enable the detector to discriminate between noise and range measuring signals.

9. The range measuring device of claim 8, wherein said controller utilizes a bit error rate to discriminate between noise and range measuring signals.

10. A communication system utilizing an ultra-wideband (UWB) transmitter, said system comprising:
    a switched impulse generator to generate a low-level ultra-wideband signal characterized by a series of UWB pulses, said switched impulse generator including one of an on-off switched oscillator, an oscillator having a time-gated dc bias that alternately biases the oscillator on and off, and an impulse-gated mixer that mixes an oscillator output;
    a filter responsive to said switched impulse generator to filter said UWB pulses thereby to produce filtered UWB pulses;
    an antenna responsive to said filter to radiate a representation of said filtered UWB pulses; and
    a receiver that detects individual ones of radiated representations of said UWB pulses, said receiver including a variable attenuator coupled to a receiving antenna to adjust attenuation levels thereof based on a rate of error detection of said radiated ultra-wideband pulses received at said receiver; and a detector to detect an output of said variable attenuator.

11. The communication system as recited in claim 10, further comprising an amplifier interposed between said filter and antenna to amplify the filtered UWB pulses.

12. The communication system as recited in claim 11, wherein said filter comprises one of a band-pass filter and a pulse shaper that substantially confines radiated emissions of said antenna within a given passband.

13. The communication system as recited in claim 10, wherein said detector comprises a tunnel diode and said variable attenuator adjusts said attenuation by alternately applying noise and received information signals to said tunnel diode.

14. The communication system as recited in claim 13, further including a controller that digitally controls the variable attenuator according to signals received during respective noise dwells and data dwells to enable the detector to discriminate between said noise and received information signals.

15. The communication system as recited in claim 14, wherein said controller utilizes a bit error rate to discriminate between noise and information signals.

16. A method of detecting an object utilizing ultra-wideband transmitting techniques, said method comprising:
impulse-switching an oscillator to generate a low-level ultra-wideband signal;
wave filtering said low-level ultra-wideband signal;
after said wave filtering step, transmitting a signal representing said low-level ultra-wideband signal; and
after said transmitting step, receiving from said object a reflected pulse of said ultra-wideband signal thereby to detect said object, said receiving step including variably attenuating the reflected pulse to adjust an attenuation level thereof according detected error in the reflected pulse received at said receiver; and detecting a signal produced by the reflected pulse after said variably attenuating.

17. The method of claim 16, further comprising the step of providing a tunnel diode to receive the reflected pulse.

18. The method of claim 16, further comprising, after impulse-switching to generate said low-level ultra-wideband signal, amplifying said low-level ultra-wideband signal.

19. The method of claim 18, wherein said filtering comprises one of bandpass filtering and pulse shaping of said low-level ultra-wideband signal in order to substantially confine said signal representing said low-level ultra-wideband signal within a given passband.

20. The method of claim 19, further comprising the step of defining a bandwidth of the signal reflected from the object.

21. The method of claim 16, further including providing a tunnel diode to detect the reflected pulse and adjusting said variably attenuating by alternately applying noise and received information signals to said tunnel diode.

22. The method of claim 21, further including digitally controlling said variably attenuating of the reflected pulse according to signal received during respective noise dwells and data dwells to enable discrimination between noise and signals representing the reflected pulse.

23. The method of claim 22, including utilizing bit error rate to discriminate between noise and signals representing the reflected pulse.

24. A waveform adaptive ultra-wideband transmitter comprising:
a signal generator to generate a series of discrete low-level ultra-wideband signals comprised of short bursts of RF energy having a carrier frequency defined cycle periodicity in respective ones of said short bursts;
a waveform adapter responsive to said low-level ultra-wideband signals and including at least one of a band-pass filter, a mixer, a pulse shaper, and an attenuator that controls one of frequency, pulse shape, bandwidth, phase, multi-level amplitude, and multi-level attenuation of said low-level ultra-wideband signals, said waveform adapter controlling said low-level ultra-wideband signals on a dynamic, real-time basis; and
an antenna responsive to said waveform adapter to radiate ultra-wideband signals.

25. In a one-pulse, one-bit ultra-wideband (UWB) transceiver system, a method of detecting transmitted information comprising:
generating a series of low-level UWB pulses of short duration,
modulating respective ones of said low-level UWB pulses according to respective bits of information,
bandpass filtering the modulated low-level UWB pulses to produce filtered low-level UWB pulses and to reject out-of-band emissions,
radiating a filtered representation of said modulated low-level UWB pulses, and
detecting at a receiver respective bits of information associated with respective ones of said UWB pulses.

26. The method of claim 25, wherein said generating step includes generating a short burst of RF energy having a carrier frequency associated with said UWB pulses.

27. The method of claim 26, wherein said short burst comprises a few cycles of RF energy that define a center frequency.

28. The method of claim 27, wherein said bandpass filtering includes wave filtering said low-level UWB pulses.

29. The method of claim 27, wherein said UWB pulses have pulse-to-pulse coherency.

30. The method of claim 27, wherein said UWB pulses lack pulse-to-pulse coherency.

31. The method of claim 27, wherein said generating step comprises impulse-driving an oscillator to produce said UWB pulses.

32. The method of claim 27, wherein said generating step comprises impulse-driving a mixer which, in turn, gates an output of an oscillator to produce said UWB pulses.

33. The method of claim 31, further comprising the step of impulse-driving the mixer with a low voltage having a short rise time thereby to enable switching at hundreds of megabits per second.

34. The method of claim 27, wherein said generating step comprises time-gating a dc bias of an oscillator to produce said UWB pulses.

35. The method of claim 27, wherein said modulating step comprises amplitude modulating said UWB pulses by on-off switching of the generating step.

36. The method of claim 27, wherein said modulating step comprises multi-level amplitude modulating said UWB pulses produced by the generating step.

37. The method of claim 27, wherein said modulating step comprises phase-shifting said UWB pulses.

38. The method of claim 34, wherein said oscillator comprises a voltage-controlled oscillator and said modulating step comprises frequency-shifting the voltage-controlled oscillator according to an information signal.

39. The method of claim 38, further comprising the step of frequency-hopping the oscillator.

40. The method of claim 27, wherein said detecting step includes utilizing a tunnel diode to detect respective bits of information.

41. The method of claim 40, further comprising utilizing a bit error rate to distinguish between error and information signals.

42. The method of claim 27 further comprising, prior to said radiating step, amplifying the filtered low-level UWB pulses.

43. The method of claim 42, further comprising gating said amplifying in accordance with occurrence of said low-level UWB pulses in said generating step.

44. The method of claim 27, wherein said short duration ranges between a sub-nanoseconds to a few nanoseconds.

45. A method of communicating data by transmitting and detecting an ultra wideband UWB pulse, said method comprising:

generating a low-level UWB pulse that includes an energy burst having a few cycles of RF energy of a defined carrier frequency, filtering the energy burst to reject out-of-band emissions, radiating a filtered representation of said energy burst, and after said radiating step, detecting a bit of information associated with said filtered representation of said energy burst, whereby to communicate data.

46. The method of claim 45, wherein said filtering step includes wave filtering said energy burst to reject out-of-band emissions.

47. The method of claim 45, wherein said generating step includes on-off switching of an oscillator to produce said energy burst.

48. The method of claim 45, wherein said generating step includes impulse-driving a mixer which, in turn, gates an output of an oscillator to produce said UWB pulse.

49. The method of claim 45, wherein said generating step includes time-gating a dc bias of an oscillator to produce said energy burst.

50. The method of claim 45, wherein said generating step includes impulse-driving a filter to produce said energy burst.

* * * * *